US008906959B2

(12) United States Patent
Perlman et al.

(10) Patent No.: US 8,906,959 B2
(45) Date of Patent: Dec. 9, 2014

(54) VEGETABLE OIL COMPOSITION CONTAINING PALM MID-FRACTION FAT AND METHOD OF REDUCING PLASMA CHOLESTEROL

(71) Applicant: Brandeis University, Waltham, MA (US)

(72) Inventors: Daniel Perlman, Arlington, MA (US); Kenneth C. Hayes, Wellesley, MA (US)

(73) Assignee: Brandeis University, Waltham, MA (US)

( * ) Notice: Subject to any disclaimer, the term of this patent is extended or adjusted under 35 U.S.C. 154(b) by 0 days.

(21) Appl. No.: 14/022,746

(22) Filed: Sep. 10, 2013

(65) Prior Publication Data
US 2014/0127386 A1 May 8, 2014

Related U.S. Application Data

(62) Division of application No. 13/669,563, filed on Nov. 6, 2012, now Pat. No. 8,809,388.

(51) Int. Cl.
| | |
|---|---|
| *A23D 7/00* | (2006.01) |
| *A23D 9/00* | (2006.01) |
| *A01N 43/16* | (2006.01) |
| *A61K 31/35* | (2006.01) |
| *A23K 1/16* | (2006.01) |
| *A23K 1/18* | (2006.01) |
| *C11B 7/00* | (2006.01) |

(52) U.S. Cl.
CPC *A23D 9/00* (2013.01); *A23D 7/001* (2013.01); *A23D 7/003* (2013.01); *A23K 1/164* (2013.01); *A23K 1/1886* (2013.01); *C11B 7/0075* (2013.01)
USPC .......................................... 514/457; 426/603

(58) Field of Classification Search
USPC .......................................... 514/457; 426/603
See application file for complete search history.

(56) References Cited

U.S. PATENT DOCUMENTS

| | | | | |
|---|---|---|---|---|
| 4,115,598 | A | * | 9/1978 | Moran ........................... 426/604 |
| 4,388,339 | A | | 6/1983 | Lomneth et al. |
| 4,390,561 | A | | 6/1983 | Blair et al. |
| 4,568,556 | A | | 2/1986 | McCoy |
| 5,578,334 | A | | 11/1996 | Sundram et al. |
| 5,843,497 | A | | 12/1998 | Sundram et al. |
| 5,874,117 | A | | 2/1999 | Sundram et al. |
| 6,630,192 | B2 | | 10/2003 | Sundram et al. |
| 7,229,653 | B2 | | 6/2007 | Sundram et al. |
| 8,114,461 | B2 | | 2/2012 | Perlman et al. |
| 2009/0136619 | A1 | | 5/2009 | Uehara et al. |
| 2011/0166224 | A1 | | 7/2011 | Kishore et al. |
| 2011/0166227 | A1 | | 7/2011 | Perlman et al. |

FOREIGN PATENT DOCUMENTS

| | | |
|---|---|---|
| WO | WO2011106618 A1 | 9/2011 |
| WO | WO2012092463 A1 | 7/2012 |

OTHER PUBLICATIONS

Lida et al. "TAG Composition and Solid Fat Content of Palm Oil, Sunflower Oil, and Palm Kernel Olein Blends Before and After Chemical Interesterification," JAOCS, vol. 79, pp. 1137-1144 (2002).
Mat Sahri et al. "Palm Stearin as Low Trans Hard Stock for Margarine," Sains Malaysiana, vol. 39, No. 5, pp. 821-827 (2010).
Palm Oil/Fraction Samples, Technical Bulletin, Fuji Vegetable Oil, Inc., Aug. 9, 2011.
PALMEL 35, Technical Bulletin, Fuji Vegetable Oil, Inc.
Ohlsson "Dairy products and plasma cholesterol levels," Food & Nutrition Research, vol. 54, No. 5124, 9 pages (2010).
Mensink et al. "Effects of dietary fatty acids and carbohydrates on the ration of serum total to HDL cholesterol and on serum lipids and apolipoproteins: a meta-analysis of 60 controlled trials 1-3," Am J Clin Nutr, vol. 77, pp. 1146-1155 (2003).
Steinberg et al. "Preventing Coronary Artery Disease by Lowering Cholesterol Levels Fifty Years from Bench to Bedside," JAMA, vol. 282, pp. 2043-2050 (1999).
Tholstrup et al. "Fat high in stearic acid favorably affects blood lipids and factor VII coagulant activity in comparison with fats high in palmitic acid or high in myristic and lauric acids 1-3," Am J Clin Nutr, vol. 59, pp. 371-377 (1994).
CHE MAN et al. "Composition and Thermal Profile of Crude Palm Oil and Its Products," JAOCS, vol. 76, pp. 237-242 (1999).
Hayes et al. "Dietary fatty acid thresholds and cholestrolemia," FASEB J., vol. 6, pp. 2600-2607 (1992).
Hayes et al. "Nonesterified Phytosterols Dissolved and Recrystallized in Oil Reduce Plasma Cholesterol in Gerbils and Humans," J. Nutr., vol. 134, pp. 1395-1399 (2004).
Pronczuk et al. "Dietary myristic, palmitic, and linoleic acids modulate cholesterolemia in gerbils," FASEB J., vol. 8, pp. 1191-1200 (1994).
Chapman et al. "A density gradient ultracentrifugal procedure for the isolation of the major lipoprotein classes from human serum," Journal of Lipid Research, vol. 22, pp. 339-358 (1981).

* cited by examiner

*Primary Examiner* — Marcos Sznaidman
(74) *Attorney, Agent, or Firm* — McLane, Graf, Raulerson & Middleton, PA

(57) ABSTRACT

A method and composition for reducing the cholesterolemic effect in mammals of ingesting a blended nutritional fat composition containing a palm mid-fraction (PMF) hardstock fat combined with an unsaturated vegetable oil. The composition is solid or semi-solid at 20° C. and fluid at 35° C., and includes between 15% and 45% by weight linoleic acid. The weight ratio of disaturated triglyceride (DST) molecules to trisaturated triglyceride (TST) molecules is greater than 10:1, and the PMF hardstock fat contains approximately 50% to 95% by weight DST molecules, the majority of which contain either palmitic acid or a combination of palmitic and stearic acids at the sn-1 and sn-3 triglyceride positions and either oleic acid or linoleic acid at the sn-2 molecular position.

30 Claims, No Drawings

VEGETABLE OIL COMPOSITION CONTAINING PALM MID-FRACTION FAT AND METHOD OF REDUCING PLASMA CHOLESTEROL

BACKGROUND

Previous clinical research has described dietary fats and their role in modulating major species of plasma lipoproteins (Mensink et al. 2003; Am J Clin Nutr, 77:1146-1155), as well as their role in coronary heart disease and controlling plasma cholesterol levels (Steinberg et al. 1999; JAMA, 282(21): 2043-2050). Other research has studied changes in lipoprotein levels resulting from dietary fats that are rich in various fatty acids. For example, Tholstrup et al. (1994; Am J Clin Nutr, 59:371-377) studied changes in lipoprotein levels resulting from diets rich in different saturated fatty acids including stearic acid, palmitic acid, and lauric and myristic acids. Researchers have also studied and compared the abilities of different fatty acids to raise or lower overall cholesterol levels in human plasma. Most nutritional experts agree that saturated fatty acids as a class raise total cholesterol levels, while polyunsaturated fatty acids lower them. Monounsaturated fatty acids, e.g., oleic acid, are considered more neutral in their effect. It is also understood that the metabolism of individual fatty acid species within each class can impact HDL and LDL cholesterol levels to different degrees.

A number of research studies have suggested that, of all the more common saturated fatty acids, including lauric acid (C12:0), myristic acid (C14:0), palmitic acid (C16:0), and stearic acid (C18:0), it is myristic acid that is the most potent in elevating total cholesterol levels in plasma. Consistent with these findings, some manufacturers of processed foods avoid the use of hardening fats such as coconut oil or palm kernel oil, which contain high levels of myristic acid, in favor of palm stearin and regular palm oil, which are also hardening fats but contain high levels of palmitic and stearic acids instead.

A recently produced commercial margarine known as SMART BALANCE buttery spread (GFA Brands, Inc., Paramus, N.J.) combines the beneficial LDL cholesterol-lowering properties of polyunsaturated fatty acids, e.g., found in soybean oil, with the beneficial HDL cholesterol-raising and oil hardening properties of saturated fats. SMART BALANCE margarine incorporates regular palm oil which is rich in palmitic acid, rather than palm kernel oil which is rich in lauric and myristic acids, to achieve the requisite hardened texture. This margarine and related healthful fat blends are based upon the work of Sundram et al., and is described in U.S. Pat. Nos. 5,578,334, 5,843,497, 6,630,192 and 7,229,653, which are incorporated herein in their entireties. Sundram et al. describe a cholesterol-free blended fat composition that combines a polyunsaturated fat (15-40 wt % linoleic acid), and a cholesterol-free saturated fat in which the saturated fatty acids provide between 20% and 40% by weight of the composition. The effect of the saturated fat, i.e., palm oil, in this margarine is to increase both HDL and LDL cholesterol while the effect of the polyunsaturated vegetable oil is to lower LDL cholesterol. The net effect of periodically or regularly consuming such a fat blend composition instead of typical American dietary fat was shown to be a modest increase in the HDL concentration and an increase in the HDL/LDL concentration ratio in the blood.

Subfractions of palm oil, including palm stearin and so-called palm mid-fractions, have been commercially prepared without any chemical modification and used as hardstocks to solidify vegetable oils in margarines and table spreads. The palm stearins are differentiated from the mid-fractions in that stearins contain a high level of trisaturated triglycerides (e.g., tripalmitin or PPP) resulting in an elevated melting point (typically about 54° C.) whereas palm mid-fractions contain a significantly reduced level of PPP and an elevated level of disaturated triglycerides (e.g., POP containing two palmitates and one oleate fatty acid) resulting in a beneficially reduced melting point (about 32° C.). Commercial stearins and mid-fractions are available with fairly similar iodine values (IV level, a measure of the amount of unsaturation in fat; grams of iodine consumed by 100 grams of fat) that are compatible with margarine and shortening use (e.g., with medium IV levels of 30-35). The use of a similar IV level palm stearin and palm mid-fraction can provide similar texture or "softness" in the fat, suitable for margarine and shortening use.

Patents related to the use of palm mid-fraction in margarines and spreads include U.S. Pat. No. 4,115,598 (Moran), U.S. Pat. No. 4,388,339 (Lomneth), U.S. Pat. No. 4,390,561 (Blair), and U.S. Pat. No. 4,568,556 (McCoy). These patents describe the use of so-called palm mid-fractions as structural fats for solidifying vegetable oils such as soybean oil and sunflower oil. The functionally important solid fat content measured at room temperature for different preparations of palm mid-fraction can vary widely depending on the content of trisaturated, disaturated, and monosaturated triglycerides. Moran describes oil-in-water emulsions having 60% aqueous phase and 40% oil phase, in which the oil phase contains high levels of a palm mid-fraction (25%-30% by weight). However, such high levels of saturated fatty acids tend to elevate total cholesterol levels in human plasma. The palm mid-fraction of Moran is combined with either high levels of sunflower oil (70-75% by weight) or combined with partially hydrogenated (i.e., trans-fatty acid-containing) soybean and canola oils. The sunflower oil-rich fats of Moran contain very high levels of linoleic acid (49%-53%) which can undesirably depress HDL "good" cholesterol. Blair et al. describe margarine oils/fats prepared using about 35%-70% by weight of a palm mid-fraction structural fat. Their structural fat has a solid fat content (SFC or SFC value) that is low, i.e., less than 50% at room temperature (70° F.). Lomneth et al. describe a margarine (spreadable water-in-oil emulsion) in which an oil phase is prepared using a similarly elevated level (35%-70% by weight) of palm mid fraction structural fat with an SFC value between 31 and 58% at 70° F. Their structural fat is typically partially hydrogenated to decrease its iodine value to 39-50 from its higher natural IV value of approximately 48 and above. Using palm mid-fraction fats with lower SFC values requires that greater amounts of the palm mid-fraction be added to a vegetable oil to achieve hardening. However, these elevated levels of palm mid-fraction undesirably increase the cholesterolemic effect of the resulting fat blend. McCoy utilizes a palm mid-fraction fat that again has a low solid fat content (from about 31% to about 58% SFC at 70° F.). This low SFC necessitates the addition of a large amount of palm mid-fraction, about 35% to 70%, to solidify between 30% and 65% of the soft oil. Once again, using such elevated levels of palm mid-fraction hard fat contributes high levels of saturated fatty acids to a blended fat composition and is expected to raise plasma cholesterol levels when such table spreads are consumed as a nutritional fat on a regular basis.

Thus, there remains a need to develop margarines and table spreads that do not raise, and preferably which lower or more effectively lower, plasma cholesterol levels.

SUMMARY OF THE INVENTION

The present invention provides nutritional fat compositions useful for reducing plasma LDL-cholesterol levels and improving the mammalian lipoprotein profile. Compared to fats traditionally consumed in the human diet, and hardened fat blends that are high in unsaturated fatty acids, the fat compositions of the invention contain reduced levels of saturated fatty acids relative to monounsaturated and polyunsaturated fatty acids. The compositions of the invention utilize unsaturated vegetable oils that are blended and hardened with a surprisingly low level of a natural variety of palm mid-fraction (PMF) hardstock fat, which is selected to have a high solid fat content or "SFC" measured at room temperature (20° C.). This reduced level of PMF contributes as little as 9% to 15% by weight of saturated fatty acids (combined palmitic+ stearic acids) to the total fatty acid content of the fat blend composition, thereby beneficially helping to control plasma total cholesterol levels when the composition is routinely used as a nutritional fat. The variety of PMF fat is also selected to contain a high level of disaturated triglycerides and a low level of trisaturated triglycerides (the latter herein shown to be cholesterolemic), together with the aforesaid elevated solid fat content measured at 20° C. With fat blend compositions being successfully hardened using a surprisingly small amount of PMF, the resulting compositions contain an overall reduced amount of total saturated fatty acids compared to previously described PMF-hardened fats. The ability to beneficially harden unsaturated vegetable oils using a low level of saturated fatty acids and a very low level of trisaturated triglycerides requires utilizing a PMF preparation having both a very high solid fat content (SFC) measured at 20° C. and negligible SFC (e.g., less than 5% or even less than 3%) measured at 35° C., as well as employing advanced margarine and shortening manufacturing methods. These methods can be combined with physical, chemical, and mechanical manufacturing conditions that control crystallization and hardening conditions, thereby enabling reduced levels of PMF to form stable solid fat blends with unsaturated natural vegetable oils such as canola oil, soybean oil and other oils.

Several factors cooperate to provide the LDL cholesterol reducing effect of the hardened vegetable oils described herein. The amount of saturated fatty acids, which are cholesterolemic, required for hardening an unsaturated vegetable oil has been reduced by decreasing the amount of PMF hardstock used in the blend. This reduced level of saturated fatty acids is made possible by using a PMF hardstock fat having a high solid fat content due to having a high disaturated triglyceride level (e.g., high 1-palmitoyl, 2-oleoyl, 3-palmitoyl (POP) triglyceride content) and yet a low trisaturated triglyceride level (e.g., low 1,2,3-palmitoyl triglyceride (PPP, tripalmitin) content. Also important is the controlled addition of C18:2 polyunsaturated linoleic acid, from the unsaturated vegetable oil, in the combined fat blend composition. That is, a sufficient but not excessive amount of linoleic acid (18:2) is introduced into the blended fat composition to beneficially reduce plasma total cholesterol levels while not reducing HDL "good" cholesterol levels. A suitable level of linoleic acid ranges between 15% and 45% by weight based on the total fatty acid content of the fat blend. The optimum level of 18:2 within this range depends upon several variables, and is preferably determined empirically. The variables include the species and amounts of various saturated fatty acids in the fat blend, as well as the amounts of different saturated fatty acid-containing triglyceride species present in the fat blend.

One aspect of the invention is a method of preparing a blended nutritional fat composition that is hardened with saturated fat. The method includes the steps of: (a) selecting at least one palm mid-fraction fat; and (b) mixing the at least one palm mid-fraction fat and at least one unsaturated vegetable oil to form the composition. The palm mid-fraction fat is selected to contain from about 60% to about 95% by weight of disaturated triglycerides and less than 6% by weight of trisaturated triglycerides. In some embodiments, the palm mid-fraction fat contains from about 55% to about 95% by weight of disaturated triglycerides. In some embodiments, the palm mid-fraction fat contains less than 5% by weight of trisaturated triglycerides. The triglyceride composition of the palm mid-fraction is such that more than 50 mol % (in some embodiments, more than 55%, 60%, 65%, or 70%) of the disaturated triglycerides contain either palmitic acid or a combination of palmitic acid and stearic acid at the sn-1 and sn-3 positions and either oleic acid or linoleic acid at the sn-2 position. The fat portion of the nutritional fat composition contains from 10% to 24% by weight of the at least one palm mid-fraction fat and from 60% to 90% by weight (in certain embodiments from 65% to 90%, or from 70% to 90%, or from 71% to 90%, or from 72% to 90%, or from 73% to 90%, or from 73% to 90%, or from 74% to 90%, or from 75% to 90%, or from 76% to 90%) of said at least one unsaturated vegetable oil. The nutritional fat composition also contains from 8% to 23% by weight (in some embodiments from about 8% to 20% or from about 8% to 18%) of disaturated triglycerides based on the total weight of triglycerides, and the weight ratio of disaturated triglycerides to trisaturated triglycerides in the composition is greater than 10:1 (in some embodiments greater than 15:1 or greater than 20:1). Further, the composition contains from 15% to 45% by weight of linoleic acid based on the total weight of fatty acids. The fat composition may contain intermediate and/or narrower ranges of linoleic acid, e.g., 20% to 40% by weight, 25%-40% by weight, and/or 30%-45% by weight linoleic acid. The sum of lauric acid and myristic acid in the composition is less than 10% by weight based on the total weight of fatty acids in the composition. In some embodiments, the sum of lauric and myristic acids is less than 9%, or less than 8%, or less than 7% by weight of the total fatty acids. The composition may also contain intermediate levels of lauric plus myristic acids, e.g., 1%-5% and/or 5%-9% by weight. The composition is solid or semi-solid at 20° C. and fluid at 35° C., and is substantially free of synthetic trans-fatty acids.

Another aspect of the invention is a blended nutritional fat composition, which can be, for example, made by the above-described method. The fat portion of the composition contains from 10% to 24% by weight of palm mid-fraction fat and from 60% to 90% by weight (in certain embodiments from 65% to 90%, or from 70% to 90%, or from 71% to 90%, or from 72% to 90%, or from 73% to 90%, or from 73% to 90%, or from 74% to 90%, or from 75% to 90%, or from 76% to 90%) of unsaturated vegetable oil. The palm mid-fraction fat contains from about 60% to about 95% by weight of disaturated triglycerides and less than 6% by weight of trisaturated triglycerides. In some embodiments, the palm mid-fraction fat contains from about 55% to about 95% by weight of disaturated triglycerides. In some embodiments, the palm mid-fraction fat contains less than 5% by weight of trisaturated triglycerides. The triglyceride composition of the palm mid-fraction is such that more than 50 mol % (in some embodiments, more than 55%, 60%, 65%, or 70%) of the disaturated triglycerides contain either palmitic acid or a combination of palmitic acid and stearic acid at the sn-1 and sn-3 positions and either oleic acid or linoleic acid at the sn-2 position. The nutritional fat composition contains from 8% to 23% by weight (in some embodiments from about 8% to 20% or from 8% to 18%) of disaturated triglycerides based on the total weight of triglycerides, and the weight ratio of disaturated triglycerides to trisaturated triglycerides in the composition is greater than 10:1 (in some embodiments greater than 15:1 or greater than 20:1). The composition contains from 15% to 45% by weight of linoleic acid based on the total weight of fatty acids in the composition. The fat composition may contain intermediate and/or narrower ranges of linoleic acid, e.g., 20% to 40% by weight, 25%-40% by weight, and/or 30%-45% by weight linoleic acid. The sum of lauric acid and myristic acid in the composition is less than 10% by weight (or in some embodiments less than 9%, less than 8%, or less than 7%) based on the total weight of fatty acids in the composition. The composition may also contain intermediate levels of lauric plus myristic acids, e.g., 1%-5% and/or 5%-9% by weight. The composition is solid or semi-solid at 20° C. and fluid at 35° C., and is substantially free of synthetic trans-fatty acids. In some embodiments, the total content of saturated fatty acids in the composition is from 15% to 40% by weight, or from 15% to 30% by weight, or from 15% to 23% by weight, based on the total weight of fatty acids in the composition. In some embodiments, the trisaturated triglyceride content of the composition is less than 3%, or less than 2%, or less than 1%, based on the total weight of triglycerides in the composition. In some embodiments, the weight ratio of linoleic acid to total saturated fatty acids in the composition is from 1:1 to 3:1. In some embodiments, the solid fat content at 20° C. of the composition is from 9% to 24% by weight based on the total weight of the composition. Intermediate solid fat content levels at 20° C. that also can be used include 9% to 15%, 15% to 20% and 20%-24%. In certain embodiments, the composition contains from 10% to 18% by weight of at least one palm mid-fraction fat, from 80% to 90% by weight of unsaturated vegetable oil, and disaturated triglycerides make up from 8% to about 18% by weight of the total triglycerides in the composition. In other embodiments, the composition contains from 10% to 20% by weight of at least one palm mid-fraction fat, from 82% to 90% by weight of unsaturated vegetable oil, and disaturated triglycerides make up from 8% to about 16% by weight of the total triglycerides in the composition. In some embodiments, the composition consists essentially of palm mid-fraction fat and unsaturated vegetable oil.

Still another aspect of the invention is a prepared food product containing a blended nutritional fat composition of the invention. In some embodiments, the fat composition is blended with water. In some embodiments the fat composition is blended with water to form a food product containing from 15% to 60% water by weight. In some embodiments, the food product contains between 40% and 80% by weight of the nutritional fat composition. In some embodiments, the blended nutritional fat composition is incorporated into a food product selected from the group consisting of margarines, table spreads, shortenings, baked goods, fried goods, filled dairy products, fat-containing confections, mayonnaise, and salad dressings.

Yet another aspect of the invention is a method of reducing the plasma LDL cholesterol in a mammalian subject, such as a human. The method includes substituting a nutritional fat composition of the invention, or a food product containing such a nutritional fat composition, in the place of other dietary fat that is solid or semisolid at 20° 'C and is consumed by the mammalian subject. In some embodiments, the composition provides from 10% to 40% of the daily dietary intake of calories by the subject. In some embodiments, the plasma LDL-cholesterol level is reduced without significantly reducing the plasma HDL-cholesterol level in the subject.

DEFINITIONS

As used herein, the terms "fat" and "oil" are used interchangeably to refer to an edible triglyceride-based composition. Such fats and oils can be obtained from a variety of sources, such as plant, microbial, and animal sources. Fats are generally solid or semi-solid at room temperature, while oils are generally fluid at room temperature.

As used herein, "fat portion" refers to the portion of a nutritional fat composition that is fats and/or oils and can also include fat- or oil-soluble materials such as monoglycerides, diglycerides, neutral fats, vitamins, or other nutrients. The fat portion does not include water.

The term "nutritional fat" or "dietary fat" or "triglyceride-based dietary fat" as used herein means any predominantly triglyceride molecule-based edible oil or fat, regardless of whether it is derived or purified from vegetable or animal sources, or is synthetic or semi-synthetic in origin, or some combination of these. A nutritional or dietary fat may also contain other constituents of choice such as monoglycerides, diglycerides, flavorings, fat-soluble vitamins, phytosterols and other edible ingredients, food additives, dietary supplements and the like. While most fats utilized in the compositions described herein retain their native triglyceride structures (i.e., they have not been structurally rearranged or chemically modified), certain of the dietary fat compositions that are discussed herein have been modified, e.g., interesterified to rearrange fatty acids (or remove certain fatty acids and attach others) on the glyceryl backbone of the fat. The fat compositions according to the invention can contain small amounts of chemically modified natural fats or oils, such as those produced by hydrogenation, partial hydrogenation, or interesterification. Preferably, the compositions do not contain such modified natural fats or oils.

The terms "natural fat" and "natural oil" refer to edible fats and oils that are extracted from animal, microbial, or plant sources, or a purified fraction of such fats and oils (e.g, a high melting or mid-melting fraction). A natural fat or oil used in the invention is substantially free of (i.e., possesses less than 10 mol %, less than 5 mol %, less than 2 mol %, or less than 1 mol %) of triglyceride molecules that have been artificially modified in structure (e.g., by chemical or enzymatic means). The edible fat or oil may be from a single source or may be a blend from multiple sources.

The term "solid fat content" (SFC) is used in connection with a fat or mixture of fats whose consistency changes from essentially solid to liquid with increasing temperature. In the U.S. the AOCS official methods for measuring SFC include AOCS Cd 16b-93 (direct method) and AOCS Cd 16-81 (indirect method). With these methods, the NMR signals from both the liquid and solid components in a fat sample are detected and measured. More specifically, these methods measure what percentage of all hydrogen nuclei in a test sample composed of hydrogen nuclei in both liquid and solid phases is due to hydrogen nuclei in the solid phase. The SFC value can be approximated as the percentage by weight of solid fat based on the total weight of fat at a particular temperature. That is, the SFC value of a fat composition at a given temperature can be approximated as the weight of solid fat at that temperature divided by the total weight of fat (i.e., solid+ liquid) in the composition, times 100.

As used in connection with structural changes to fatty acids and/or triglycerides, the terms "chemically modified", "synthetic" (e.g., synthetic trans-fatty acids) and "interesterified" mean that a man-made (i.e., not made by nature) structural change has been introduced that modifies the chemical structure of a fatty acid (e.g., by hydrogenation) or the location/site of attachment of a fatty acid in the triglyceride molecule. Such structural changes may, for example, be accomplished by synthetic chemical and/or by enzymatic processes.

For some, but not all, of the fat compositions described herein it is beneficial that the resulting fat-based composition is substantially cholesterol-free because the presence of cholesterol degrades the lipoprotein profile, undesirably increasing LDL cholesterol and increasing the LDL/HDL ratio in the plasma. The term "substantially free" in reference to cholesterol level means that the dietary fat contains less than 10 mg cholesterol per serving of a food containing the dietary fat, more preferably less than 5 mg per serving, and most preferably less than 2 mg per serving to qualify as "cholesterol-free" under current U.S. FDA regulatory standards. Notwithstanding the aforesaid preference, fat compositions described herein are sometimes combined with as much as an equal weight of butter, in which butter contains 215 mg cholesterol per 100 g, and the resulting fats are encompassed by the present invention. With regard to the definition of "serving size," the USDA Center for Nutrition Policy and Promotion is the authority in charge of setting the standards for serving sizes in the United States. This serving size is referenced on the Nutrition Facts label on packaged food products, and allows comparison of the nutritional value of similar as well as different food products. For example, milk and yoghurt cite 1 cup or 8 fl. oz., cottage cheese cites ½ cup and margarine cites 1 tablespoon as standard serving sizes. The U.S. Food and Drug Administration (FDA) utilizes the term "Reference Amount Customarily Consumed (RACC)" for the amount of a particular food consumed by the general population at one eating occasion. If the FDA and USDA serving sizes differ, the USDA serving size is the standard utilized herein.

In reference to fatty acids and their attachment to the glyceryl moiety of the triglyceride molecule, there are three hydroxyl positions for esterification of the fatty acids. These positions allow for different triglyceride structural isomers, i.e., stereoisomers to be formed. The three points of attachment known as the sn-1, sn-2 and sn-3 positions have metabolic significance. While the physical properties of the fat (e.g., hardness, melting point crystal structure) are affected by each fatty acid attached at each position, the fatty acid at the middle or sn-2 position often has the greatest impact on affecting the level of different plasma lipoproteins. This is because digestion and enzymatic hydrolysis by pancreatic lipase removes the sn-1 and sn-3 esterified fatty acids, leaving the sn-2 fatty acid monoglyceride to be absorbed into the bloodstream.

Reference herein to "fatty acids" encompasses both free fatty acids and such fatty acids that are esterified to a glycerol backbone in the form of a mono-, di-, or triglyceride. Primarily the fatty acids will be present as triglycerides, although appreciable amounts of di- and monoglycerides may also be present, along with small amounts of free fatty acids.

Indication that a hardstock fat composition such as PMF fat contains a "reduced level or amount of trisaturated triglycerides" means that the fat contains no more than 6% by weight of trisaturated triglycerides on the basis of the total triglycerides in the PMF fat. In some embodiments, the reduced level of trisaturated triglycerides is less than 5% or less than 3% by weight of the triglycerides in the PMF fat. If more than one PMF fat is used, then the above percentage of trisaturated triglycerides refers to a weight percentage based on the total triglycerides in all of the PMF fats taken together. When the hardstock fat is blended and diluted (typically 4-fold or more) with an unsaturated vegetable oil, and the resulting fat composition is identified as "substantially free of trisaturated triglycerides", that means that no more than 1.5% by weight of the triglycerides in the fat blend composition contain three saturated fatty acids. In some cases, the percentage will be lower, e.g., no more than 1.25, 1.0, 0.7, 0.5, 0.4, 0.3, or 0.2% by number.

Unless indicated to the contrary, range references specified herein include the endpoints of the range.

As used herein with respect to percentages or ratios of types of fatty acids in a dietary fat composition, the term "and/or" means that the quantity refers to either one of a pair, or to both of the pair individually, or to a combination of the pair of specific types or classes of fatty acids. Each distinct combination of composition levels is specifically included. For example, specifying that a composition contains at least 10% by weight palmitic acid and/or stearic acid means that the composition may, for example, contain at least 10% palmitic acid, or at least 10% stearic acid, or at least 10% palmitic acid and at least 10% stearic acid, or contains a total at least 10% palmitic acid plus stearic acid.

Dietary fat compositions as provided and calculated herein are often expressed in terms of their fatty acid make-up on a weight percentage basis. As used herein, a percentage of a specific fatty acid by weight refers to the percentage of that fatty acid with respect to ("based on") the sum total weight of fatty acids in triglyceride-based fats and fat blends, which is set equal to 100% (not ~95% as used in certain USDA tables). The ester-linked glyceryl carbon linked to each fatty acid in the triglyceride molecule is not included in this calculation since metabolism and/or hydrolysis of fats yielding fatty acids leaves the glyceryl carbon behind. i The term "unsaturated fatty acids" as used herein refers to fatty acids containing at least one carbon-carbon double bond, and as such, includes all fatty acids except the saturated fatty acids. That is, unsaturated fatty acids are the sum of monounsaturated and polyunsaturated fatty acids. The most common unsaturated fatty acids include the monounsaturated fatty acid, oleic acid (18:1), and the polyunsaturated fatty acid, linoleic acid (18:2). The omega-3 polyunsaturated fatty acids include α-linolenic acid (18:3, n-3 or ALA), and the so-called long chain omega-3 polyunsaturated fatty acids, eicosapentaenoic acid (EPA) and docosahexaenoic acid (DHA). EPA (20:5, n-3) and docosahexaenoic acid (22:6, n-3) contain 5 and 6 double bonds in carbon chains of 20 and 22 carbon atoms, respectively.

As used in reference to components in the present compositions, the terms "principally" and "primarily" and "majority" mean that the referenced component constitutes more than 50% of the indicated composition or combination of components, and in some cases may be significantly greater, e.g., at least 60, 70, 80, 90 or 95%.

With the consumption of dietary fat as natural triglycerides it is important to maintain a ratio of polyunsaturated fatty acids as linoleic acid to saturated fatty acids, in which this ratio can range between 1:1 to 3:1 (and sometimes as low as 0.5:1.0), and further in which the dietary fat is substantially cholesterol-free. In reference to the present fat compositions, the terms "balanced fat" and "balanced fat composition" similarly refer to a fat composition in which the total saturated fatty acid content including C12:0 lauric, C14:0 myristic, C16:0 palmitic and C18:0 stearic acid approximates the total C18:2 linoleic acid content of the fat composition. When expressed as a ratio of saturated fatty acids to linoleic acid, this ratio can range between 0.5:1 and 2:1.

Indication that an edible oil is "rich in palmitate" or "rich in linoleate" and similar terms means that the oil contains at least 10% by weight, and often at least 15, 20, 25, 30, 40, or 50% by weight of the specified fatty acids or combination of fatty acids.

As used herein, the term "mammal" refers to both humans and other mammals, and includes experimental mammalian model animals, e.g., gerbils, hamsters, rats and the like, as well as to livestock animals referring to a vertebrate animal which is farmed or ranched. In particular, livestock animals include bovines (such as cattle), equines, caprines (such as domestic goats), ovines (such as domestic sheep), avians (such as chickens, turkeys, and ducks), as well as canines and felines, including companion animals such as domestic dogs and cats.

The term "cholesterolemic effect" as used herein, refers to the ability of certain foods and food ingredients, including certain fats and fatty acids contained within these fats, as well as cholesterol present in animal fat, dairy products, meat, fish, and the like, to increase plasma levels of one or more of the following: total cholesterol (TC), LDL-C, and VLDL-C. Any increase in HDL "good" cholesterol is not included in this term.

The term "hard fat", "hardening fat", "hardstock", or "solid fat" (in relationship to triglyceride-based fat compositions) is used herein to describe a stearin fat, palm mid-fraction (PMF) or palm oil for example, and refers to any edible triglyceride-based fat or fat mixture that is solid at room temperature and that can be combined with one or more edible liquid oils, e.g., liquid vegetable oils, to solidify these oils, rendering them useful in margarines, table spreads, shortenings and other processed foods. This definition is not meant to exclude the use of other agents that may also be used to solidify edible oils, e.g., mono- and diglycerides that are closely related to fats.

The term "unsaturated oil", "unsaturated vegetable oil", or "unsaturated natural vegetable oil" as used herein, refers to an edible triglyceride-based oil or mixture of oils including both monounsaturated vegetable oils, e.g., olive oil, high oleic sunflower oil and canola oil as well as to polyunsaturated vegetable oils, e.g., soybean oil, corn oil, peanut oil, sunflower oil, safflower oil and cottonseed oil that are substantially liquid at room temperature.

The term "synthetic trans-fatty acid" or "trans-fatty acid" or "trans-fat" as used herein, refers to a fatty acid, typically within a triglyceride molecule that has been chemically altered by man (usually by a partial hydrogenation process) from its natural cis-isomer chemical bond configuration (between neighboring carbon atoms in the fatty acid structure) to the so-called trans configuration. Usage of this term herein (carrying the artificial or man-made implication) is intended to exclude naturally occurring trans-fatty acids such as trans-vaccenic acid that is thought to be beneficial and found in the fat of ruminants and in dairy products, for example.

The terms "trisaturated" (TST), "disaturated" (DST), "monosaturated" (MST) and "unsaturated" (UST) as they modify the term "triglyceride" as used herein, refer to the presence of three, two, one, or zero saturated fatty acids linked to the 3 carbons forming the glyceride backbone of the fat (triglyceride) molecule. These categories of triglyceride molecules can be denoted as $S_3$, $S_2U$, $SU_2$, and $U_3$ where S represents a saturated fatty acid, U represents either a monounsaturated or a polyunsaturated fatty acid, and the subscript refers to the number of fatty acids (the absence of subscript denoting one fatty acid).

The terms "melting point" (m.p.) and "Mettler Drop Point" as used herein, are intended to be interchangeable and refer to the transition temperature at which a solid fat becomes sufficiently fluid to begin to flow as a liquid droplet out the bottom of a small hole in a sample-holding cup. During warming, the Mettler Drop Point is typically reached before full melting and optical transparency is achieved. The same is true for the softening point (AOCS Method Cc 3-25), the slip point (Cc 4-25) and the Wiley melting point (Cc 2-38) for fats.

The terms "solid", "semi-solid", and "liquid" as used herein, refer to the physical state of a fat or an oil, mixtures of fats and/or oils, i.e., fat blends, fat-oil blends, oil blends, and any other mixtures containing fat(s) and/or oil(s) such as margarines, table spreads, shortenings, and other processed foods that include fat(s) and/or oil(s). The term "solid" refers to a material that is firm enough to hold shape under moderate finger pressure. A refrigerated stick of margarine or butter is considered solid. By comparison, a table spread that is warmed to 20° C., for example, and typically holds its shape under the force of gravity, but is very plastic and easily spreadable by knife is considered a "semi-solid." In contrast, a "solid" material is not very plastic and is not easily spreadable by knife. A "liquid" or "fluid" material, such as salad oil at room temperature, does not hold its shape under the force of gravity but flows under the force of gravity.

The following abbreviations are used herein: Solid fat content (SFC); Plasma total cholesterol (TC); Plasma triglycerides (TG); Low density lipoprotein (LDL); Very low density lipoprotein (VLDL); High density lipoprotein (HDL); Palm mid-fraction (PMF); Saturated fatty acids (SFA); Monounsaturated fatty acids (MUFA); Polyunsaturated fatty acids (PUFA); Saturated fats (SATS) are fats rich in SFA; Monounsaturated fats (MONOS) are fats rich in MUFA; Polyunsaturated fats (POLYS) are fats rich in PUFA; Palm stearin (PS).

DETAILED DESCRIPTION OF THE INVENTION

The inventors have found that ingesting palm mid-fraction hardstock fat that contains palmitic and stearic acids at the sn-1 and sn-3 triglyceride positions, together with sufficient levels of polyunsaturated fatty acids in the form of linoleic acid (C18:2), in combination with other dietary fat, unexpectedly provides beneficial improvements in the mammalian plasma lipoprotein profile. Without intending to limit the invention to any particular mechanism, it is known that saturated fatty acids increased blood levels of both HDL and LDL, and as a result, ingestion of a diet excessively rich in saturated fatty acids undesirably elevates total serum cholesterol (TC) and the TC/HDL ratio. However, if a moderate proportion of saturated fatty acids is ingested together with a sufficient amount of polyunsaturated fatty acids, primarily linoleic acid, the level of LDL is reduced, resulting in a desirably lower TC/HDL ratio.

Surprisingly, it was found that the reduction of TC is more effective when a significant amount of the saturated fatty acids is contributed by a palm oil fraction called palm mid-fraction (PMF) hardstock fat rather than other palm oil products such as palm stearin hardstock fat or partially hydrogenated trans-fatty acid-containing fats, or interesterified fats containing saturated fatty acids at the sn-2 position.

One possible explanation of this effect is that digestion by pancreatic lipase of palm stearin leaves principally sn-2 palmitic acid-containing monoglycerides, which are cholesterolemic according to the present invention, whereas similar digestion of PMF leaves principally sn-2 oleic and linoleic acid-containing monoglycerides, which are far less cholesterolemic according to the present invention. This is illustrated, for example, in the dietary study results shown in the examples below in Tables 3 and 6 with the comparison of lipid profiles for a diet containing PMF fat (Diet 711) with a diet containing palm stearin (Diet 710), or the comparison of a diet containing a PMF-hardened margarine H (Diet 722) with diets containing either a palm kernel oil-hardened margarine E (Diet 720) or so-called American Fat Blend margarine B (Diet 719). Diets 711 and 722 resulted in notably lower values for TC and/or LDL-C, for example.

When a significant fraction of dietary saturated fatty acids is provided by PMF rather than by palm stearin, and when other cholesterolemic components are not excessive, relatively low levels of linoleic acid can be effective in limiting TC and LDL levels which might otherwise be elevated from saturated fatty acids contributed by the hardstock fat. This allows relatively low ratios of polyunsaturated fatty acids (primarily linoleic acid) to saturated fatty acids to be effective. For example, P/S ratios (in which P is the weight percent of linoleic acid in the fat portion of the composition and S is the sum of the weight percentages of saturated fatty acids in the same composition) of about 1:1 to 3:1 (and also as low as 0.5:1.0) provide sufficient linoleic acid to effectively compensate for the lipoprotein-elevating effects of the saturated fatty acids.

The animal model data described in the examples below, including plasma lipoprotein data, lead to conclusions that differ from previously held views relating to palmitic acid (C16:0) and lipoprotein metabolism. Others have used small increments of milkfat containing sn-2 palmitic acid in dietary fat blends and observed altered lipoprotein profiles in human and other mammalian plasmas without suitable explanation. However, in view of the present invention and the data described herein, it is now apparent that an improved benefit is achieved if two criteria are met: (1) using PMF hard fat containing predominantly 16:0 and/or 18:0 at the sn-1 and sn-3 positions to replace less healthy hard fats such as partially hydrogenated vegetable oils, palm stearin and milkfat (which upon digestion, yield cholesterolemic sn-2 16:0 and sn-2 18:0); and (2) adding sufficient 18:2 linoleic acid to the blended fat composition by addition of one or more unsaturated vegetable oils.

A phospholipid derived from an sn-2 saturated fatty acid monoglyceride has the inherent ability to raise plasma cholesterol levels, especially LDL cholesterol (LDL-C). According to the present invention, saturated fatty acids, especially palmitic acid (16:0), inserted at the sn-2 position of triglyceride molecules (present in milkfat as well as trisaturated palm stearin fat), undesirably reduce the HDL-cholesterol level (HDL-C) and increase the LDL-C/HDL-C ratio. Thus milkfat or palm stearin, in which many or most of the sn-2 positions (approximately 80% in milkfat) are occupied by saturated fatty acid, is the wrong choice for an advantageous "healthy fat" for adults, principally because it lacks sufficient polyunsaturated fatty acids, such as linoleic acid, at the sn-2 position. The invention provides dietary fat that is effective at improving human lipoprotein profiles and/or glucose metabolism over a broad population by supplying adequate sn-2 unsaturated fatty acids, especially sn-2 linoleic acid.

Furthermore, it is desirable to have no more than a low level of tri-saturated triglycerides in a nutritional fat composition. As a result, it is beneficial for a large percentage of the triglycerides containing one or more saturated fatty acids to also contain at least one unsaturated fatty acid, preferably including at the sn-2 position as is typically found in natural oils including the PMF hardstock fat of the present invention. For example, a beneficial triglyceride may have palmitate at the sn-1 and sn-3 positions and oleate or linoleate at the sn-2 position. The presence of significant levels of sn-2 unsaturated fatty acids is further beneficial for the synthesis of phospholipids. These desirable combinations of fatty acids can be provided using natural fats and/or oils, without requiring chemical interesterification, which generally randomizes fatty acids in triglycerides, resulting in non-natural distributions of fatty acids in the respective glyceryl positions.

In order to maintain lipoproteins at appropriate levels, certain beneficial fat compositions contain at most a low or very low level of tri-saturated triglycerides. Such compositions also contain a sufficient level of polyunsaturated fatty acids (primarily linoleic acid) to reduce the LDL level. Now, according to the present invention, linoleic acid located in the sn-2 position is recognized as most active in this regard, and therefore it is desirable to provide a sufficient fraction of the linoleic acid located at the sn-2 position. According to the invention, it is advantageous for only a minor proportion (e.g., less than 20 mol %) of the palmitic, lauric and/or myristic acid content in a natural blend of fats and oils to be located at the sn-2 position, but preferably not at a level that prevents the LDL-lowering effect of linoleic acid. Preferably, the total amount of lauric and/or myristic acids (i.e., the sum of lauric acid+myristic acid) in the dietary fat composition is less than 10% by weight based on the total fatty acids in the composition. Small amounts of other polyunsaturated fatty acids and saturated fatty acids may also be present in the composition. Substantially the remainder of the nutritional fat composition is monounsaturated fatty acids, primarily oleic acid.

Thus, the invention concerns compositions and methods for selectively increasing or at least maintaining the plasma level of HDL "good" cholesterol (HDL-C), decreasing the level of TC and LDL "bad" cholesterol (LDL-C), reducing the TC/HDL ratio, and reducing or maintaining total blood triglycerides by consuming a substantially cholesterol-free or limited cholesterol-containing nutritional fat- and oil-based composition that contains an appropriate balance of linoleic acid, oleic acid, and saturated fatty acids, especially including palmitic acid. Preferably, the fat composition contains an appropriate amount of unsaturated fatty acids at the sn-2 position, e.g., linoleic acid and oleic acid. The sn-2 unsaturated fatty acids appear particularly beneficial in this position while also disrupting tri-saturated triglycerides. In some cases, the composition can also contain myristic acid and/or lauric acid.

The invention also contemplates fat compositions that assist individuals in limiting total serum triglycerides and/or serum cholesterol and especially LDL and/or VLDL, and/or limiting the TC/HDL cholesterol ratio. These fat compositions can be used in the preparation of foods, as part of prepared foods, and/or directly consumed as part of a diet.

To have a measurable impact on lipoprotein metabolism, the dietary fat blend should be used regularly as a nutritional fat. Many processed food products can be produced, that incorporate the PMF-containing fat blend compositions taught herein. Among many others, these include baked and fried foods, margarines, table spreads and shortenings that are hardened, i.e., rendered solid or semi-solid at room temperature (i.e., about 20° C.) with added levels of from approximately 10% to 24% by weight of PMF hardstock fat. Preferably, the hardened nutritional fat compositions which are solid or semi-solid at 20° C. are liquid at 35° C. and above, so that they melt in the mouth upon consumption.

Nutritional Fat Compositions

A nutritional fat composition according to the invention includes a blend of an unsaturated vegetable oil with a hardstock fat source such as PMF, which supplies sufficient saturated fatty acids and solid fat content to harden the composition at room temperature while maintaining the cholesterol lowering effect of unsaturated fatty acids provided by the vegetable oil. PMF invariably contains a certain level of tri-saturated triglyceride molecules ("TST"). These are shown herein to be cholesterolemic (see below). Consequently, it is important to minimize the total amount of TST added to a blended fat of the invention via the addition of PMF by selecting a suitably fractionated PMF. Such a PMF should contain a high level of disaturated triglycerides ("DST") and a low level of TST. Either a single PMF can be used, or more than one PMF can be combined. For example, PMFs derived from different source materials can be used together, as well as PMFs produced by somewhat different fractionation procedures. Another alternative is to blend one or more PMFs with selected components, such as desired DSTs, obtained from other (e.g., non-palm) natural sources, made by chemical modification of natural fats (e.g., by interesterification), or made synthetically. The PMF, or combined or supplemented PMF(s), should be blended with at least one unsaturated vegetable oil to provide an amount of polyunsaturated fatty acids, preferably as 18:2 linoleic acid, that is approximately equal to or greater than the total weight of saturated fatty acids contained in the blended nutritional fat composition.

The present inventors have previously developed dietary fat blends that reduce plasma LDL-cholesterol levels in humans and improve their lipoprotein profiles using palm oil blended with polyunsaturated vegetable oils (see U.S. Pat. Nos. 5,578,334; 5,843,497; 6,630,192; and 7,229,653). These fat blends provide a weight ratio of polyunsaturated (P) linoleic acid (18:2), to total saturated (S) fatty acids of approximately 1:1. However, by using PMF as a hardstock fat, the currently useful P/S ratio range can be beneficially made considerably broader, extending upward from approximately 1:1 up to approximately 3:1. This is because low levels of certain PMF preparations are unexpectedly effective at solidifying liquid vegetable oils. Instead of requiring 25%, 30%, 35% or higher levels (by weight) of PMF included in blended fat compositions, the present inventors found that levels as low as 15% or 20% by weight PMF can be effective to render a vegetable oil solid or semi-solid at room temperature. Therefore, unexpectedly greater and beneficial proportions of polyunsaturated fatty acids can be added relative to saturated fatty acids in PMF fat blends.

The question was investigated whether any palm oil fractions are beneficially less cholesterolemic than others. For example, could any of the three glyceride carbon positions (sn-1, sn-2, or sn-3) be a preferred location for carrying the major saturated fatty acids in palm oil, i.e., palmitate (C16:0) and stearate (C18:0), and how does this affect lipoprotein metabolism? As a corollary question, with palm oil and its subfractions, if a certain amount of palmitic acid is to be added to a blended vegetable oil/fat composition to harden the oil, would there be any benefit in providing the palmitic acid as palm stearin versus palm oil versus palm mid-fraction? As shown below, each of three different palm oil-related fats was found to contain very different proportions of three classes of saturated fatty acid-containing triglycerides, and these were evaluated for their effects on mammalian lipoprotein metabolism.

In Table A, the percentage content of palmitic acid is provided ("% P" based on a total of 100%) for the three classes of saturated fatty acid-containing triglycerides in palm stearin, PMF, and palm oil. The relative C16:0 palmitate content is shown in the numerator along with the relative weight of the saturated triglyceride components (in the denominator) is shown for each of the fats (weight of trisaturated triglyceride ("TST"), disaturated ("DST") and monosaturated triglyceride ("MST")). The data provided in the following Table A for selected sources identified below for palm stearin, palm mid-fraction and palm oil are calculated as follows:

TABLE A

| | % P/weight TST | % P/weight DST | % P/weight MST |
|---|---|---|---|
| Palm Stearin | 52/35 | 40/37 | 8/16 |
| Palm Mid-Fraction | 5/3 | 90/84 | 5/10 |
| Palm Oil | 15/9 | 61/46 | 24/35 |

From these numbers, it is apparent that the major concentration of palmitic acid within the classes of saturated fatty acid-containing triglycerides shifts from principally TST+DST for stearin to almost exclusively DST for palm mid-fraction to a mixture of DST+MST for palm oil.

In the case of a palm stearin of IV 30.5 (IV=iodine value, see Che Man et al., "Composition and Thermal Profile of Crude Palm Oil and Its Products," JAOCS; 76; 237-242; 1999), it is calculated that approximately 52% by weight of the palmitate content is found in trisaturated ("TST"), 40% in disaturated ("DST") and 8% in monosaturated ("MST") triglyceride molecules, where overall, the stearin contains approximately 35% by weight TST, 37% DST and 16% MST. By comparison, for a 34.4 IV palm mid-fraction (Moran, U.S. Pat. No. 4,115,598) it is calculated that approximately 5% by weight of the palmitate content is found in trisaturated, 90% in disaturated and 5% in monosaturated triglyceride molecules, where overall, the mid-fraction contains approximately 3% by weight TST, 83% DST, 10% MST, and 4% unsaturated triglycerides. And finally, for a 51.5 IV RBD palm oil (Che Man et al., 1999), it is calculated that approximately 15% by weight of the palmitate content is found in trisaturated, 61% in disaturated and 24% in monosaturated triglyceride molecules, where overall, the palm oil contains approximately 9% by weight TST, 46% DST, 35% MST, and 5% unsaturated triglycerides.

PMF is fractionated from natural palm oil and, among a variety of saturated fatty acid-containing triglycerides present therein, PMF contains predominantly DST molecules that combine saturated fatty acids (palmitate and some stearate) with an unsaturated fatty acid (oleate or linoleate) typically in the middle (sn-2) position. PMF differs significantly from palm stearins, which contain an abundance of TST molecules in combination with DST molecules. On the other hand, palm olein differs from both PMF and palm stearin by containing largely MST molecules. It is difficult to predict a priori which of these fats is "healthiest" in terms of lipoprotein metabolism when blended with an unsaturated vegetable oil such as canola and/or soybean oil. Each solid fat is expected to be metabolized somewhat differently, and when diluted and co-metabolized with an unsaturated vegetable oil, may yet again be metabolized differently, to produce varying levels of TC, LDL, VLDL and/or HDL cholesterol in the mammalian plasma.

Different commercial preparations of PMF can vary widely in their chemical composition and physical specifications, including but not limited to their iodine values, solid fat contents as a function of temperature, and their triglyceride structural isomer contents for trisaturated, disaturated and monosaturated triglyceride molecules. For the sake of illustration, it is informative to compare the triglyceride molecules in two theoretical PMF preparations containing the same percentages by weight of palmitate and oleate, PMF-1 may contain 3 parts by weight disaturated POP (palmitate at the sn-1 position, oleate at sn-2 position and palmitate at the sn-3 position)+1 part monosaturated POO+1 part trisaturated PPP, whereas the second preparation, PMF-2 may contain exactly the same amounts of various fatty acids, but may contain 5 parts by weight of almost exclusively POP. Among the commercial preparations of special interest for usage herein are PMF preparations rich in DST, e.g., PMF-2 above. Commercial PMF fats whose solid fat content ("SFC") at 20° C. exceed 50%, 60% or even 70%, but whose SFC at 35° C. is low ornegligible are of special interest herein because they tend to be particularly rich in DSTs while being depleted of both MST and TST (the latter TST having a melting point above 35° C., and shown herein to be undesirable owing to its cholesterolemic nature in mammals).

For the purposes of the present disclosure, important and preferred DST molecules in PMF include 1,3-dipalmitoyl-2-oleoyl glycerol (also called POP triglyceride), 1,3-dipalmitoyl-2-linoleoyl glycerol (also called PLP triglyceride) and 1-palmitoyl-2-oleoyl-3-stearoyl glycerol (also called POS/SOP triglycerides). Research disclosed herein shows a remarkable benefit derived from using a minimum but sufficient amount of PMF as a hardening fat in which the PMF selected, contains as small a proportion of trisaturated triglycerides as possible (through appropriate fractionation of PMF from palm oil). Furthermore, the selected PMF fat has a particularly high solid fat content (SFC) at 20° C. owing to the predominance of DSTs.

Natural palm oil fractions available for hardening a vegetable oil include palm stearin, palm mid-fraction and whole palm oil. Among these, there are multiple parameters that may be considered in selecting a solid palm fat. Various palm fractions differ in cost, initial softening and melting point temperatures, hardening efficacy at a particular temperature per gram of material (reflecting the SFC at that temperature), saturated fatty acid content (SFA) and adverse cholesterolemic potency per gram. Whole palm oil is cost-effective, but for many uses has too low a softening temperature to be an effective hard fat. On the other hand, both palm stearin (m.p. ~56° C.) and mid-fraction (m.p. ~32° C.) have been found to be effective hard fats for solidifying vegetable oils, and both have found commercial uses. Because the stearin fraction has a higher melting point than the mid-fraction, there is an upper limit to the amount of stearin that can be added to a vegetable oil before the hardened fat acquires a waxy mouth feel, whereas more mid-fraction can be added without this problem. With regard to triglyceride structure, palm stearin contains approximately 35% by weight TST, 37% DST and 16% MST whereas, depending on fractionation conditions, palm mid-fraction typically contains 5% or less TST, 55%, 60%, 70%, 80% or more of DST, and approximately 10-20% MST. Therefore, the high level of TST present in stearin versus the high level of DST present in mid-fraction are important in distinguishing these palm fractions.

For the sake of comparison, it is interesting to consider adding 10% by weight saturated fatty acids (SFA) from palm stearin or from palm mid-fraction to separate batches of vegetable oil shortening to harden the oils. The mid-fraction with its predominant DST population of molecules may add up to 50% more saturated fatty acid-rich triglyceride molecules than the stearin with its predominant TST molecules. Comparing the likely plasma cholesterolemic response to DST and TST molecules, while it could be argued that a DST molecule is less cholesterolemic than a TST molecule, the actual lipoprotein results, i.e., TC and LDL-cholesterol levels as well as the ratios of TC (and LDL-C) to HDL-C in mammalian plasma, are difficult if not impossible to predict without experimentation. Furthermore, the extent to which a particular SFA-containing triglyceride molecule is cholesterolemic may depend upon the level of other triglycerides in a meal, as well as the levels of particular polyunsaturated fatty acid and monounsaturated fatty acid molecules in the dietary fat. Accordingly, carefully controlled nutritional studies have been performed in which all nutritional variables were kept substantially constant except for one variable being tested. In the experiments described below in Example 2 (see Tables 1 and 2), the amount of dietary fat (expressed as a % of dietary energy), the ratio of dietary fatty acids (PUFA/MUFA/SFA) and the particular species of fatty acids (e.g., palmitic, stearic, etc.) were maintained relatively constant, while, for example, the saturated fat-containing triglyceride structure (DST versus TST) was varied by feeding appropriate levels of palm mid-fraction versus palm stearin.

A preferred fat composition of the invention contains triglycerides with low saturated fatty acid content at the sn-2 position. The composition can contain myristic and/or lauric acid, some of which may be in the sn-2 position, while the amount of sn-2 palmitate should be minimized. Nevertheless, significant amounts of palmitic acid, such as provided by PMF fat, can be safely incorporated into fat compositions provided that the palmitate is selectively localized at the sn-1 and sn-3 positions. Conversely, from the results reported herein (see Tables 3 and 6), palm stearin, which contains high levels of tripalmitate and provides substantial amounts of sn-2 palmitic acid, should be minimized.

The preferred composition also includes sufficient linoleic acid to reduce LDL-C without significantly reducing HDL-C. For example, the composition preferably contains linoleic acid at from 15 to 45%, from 10 to 40%, from 8 to 40%, or from 9 to 40% by weight based on the total fatty acid content. The composition also preferably contains saturated fatty acids at from 15% to 40% by weight based on the total fatty acid content, and from 30% to 65% by weight of oleic acid based on the total fatty acid content. Oleic acid is considered an essentially "neutral" fatty acid in terms of affecting cholesterol, LDL, and HDL. The sum of weight percentages for saturated, monounsaturated and polyunsaturated fatty acids in all cases equals 100%. The phrase "without significantly reducing" HDL-cholesterol means that the HDL-cholesterol level is not reduced by more than 5%. In some embodiments, HDL-cholesterol remains about the same, and in some embodiments it may be increased.

The advantage of utilizing a nutritional fat composition according to the invention as a component or replacement for a significant portion of a dietary fat is that it can beneficially affect LDL-C and HDL-C levels. There is an extensive body of clinical evidence that dietary intervention with edible fats and oils that increase plasma levels of HDL cholesterol, while decreasing the TC, LDL-C, VLDL-C levels, and the ratios of LDL-C to HDL-C and TC to HDL-C, all provide substantial health benefits in terms of reducing the risk of coronary heart disease and other health problems.

The proportion of polyunsaturated fatty acids, such as linoleic acid, to be used in a dietary fat composition is also an important consideration. The concept of balanced fatty acids between polyunsaturated and saturated fatty acids is described by Sundram et al. in a series of U.S. patents cited above, with the proportion of linoleic acid being set from 15% to 40% by weight and the total saturates being set from 20% to 40% by weight. According to the present invention, however, the range of linoleic acid in a dietary fat is from 15 to 45%, from 10 to 40%, from 8 to 40%, from 9 to 40% or from 10 to 40% by weight. A preferred range of linoleic acid is from 10 to 20% by weight, but in some cases as high as 30 or 40% can be used, for balancing a total saturated fatty acid content of from 15% to 55% (or in particular cases, 15 to 45% or 15 to 40%) by weight in the dietary fat composition. The lower levels of linoleic acid of the present invention are more effective because the level of trisaturated triglycerides is also low, and because the level of sn-2 saturated fatty acids, especially sn-2 palmitate, is low. The present invention teaches that it is not advantageous simply to increase the level of polyunsaturates, which is surprising and contrary to conventional nutritional teaching, because at excessively high levels, the lipoprotein profile becomes less desirable.

The proportion of saturated fatty acids in the dietary fat is also a matter to be considered in formulating a balanced oil. Clearly, the level of myristic acid and/or lauric acid and the proportions of myristate and/or laurate residues (including in the bioactive sn-2 position of the triglyceride molecule) are important. But it is an open question as to the degree to which the overall proportion of saturated fatty acids in the diet is critical (excluding myristate and/or laurate). The discussion in U.S. Pat. Appl. No. 20110166227 suggests that dietary cholesterol may be a substantial problem when fed with substantial levels of saturated fatty acids in degrading a healthy lipoprotein profile. Given that saturated animal fats in meats and butter are widely consumed and widely known to contain substantial levels of cholesterol, whereas saturated vegetable fats (e.g., palm oil) that are cholesterol-free have been historically less common in the American diet and poorly understood, there is a common misconception that all saturated fat is harmful. In fact, in light of the HDL-C and LDL-C/HDL-C data presented in Table 1 of U.S. Pat. Appl. No. 20110166227, it is suggested that the range of total saturated fatty acids in a dietary fat can safely vary between 15% and 40% or even 50% by weight in the substantial absence of dietary cholesterol and in the presence of adequate unsaturated fatty acids, especially polyunsaturated fatty acids.

The cholesterol concentration in a dietary fat should be minimized to avoid degrading the lipoprotein profile. It is preferable that dietary cholesterol not exceed 2 mg per serving as this is the maximum permissible cholesterol level allowed under U.S. FDA regulations for a product to be labeled as cholesterol-free. For a 14 g serving of table spread, this level represents 0.014% by weight cholesterol. By comparison, a low cholesterol food may contain up to 20 mg (0.14% by weight) cholesterol per serving, while butter typically contains 0.22% by weight cholesterol (16-fold higher than a cholesterol-free product). In advantageous cases, the fat composition contains no more than 0.014% by weight cholesterol, but in some instances may contain as much as 0.12% by weight cholesterol (approximately half the level in butter).

The level of linoleic acid in the nutritional fat composition is sufficient for decreasing LDL even when fed in the presence of a substantial but not excessive level of myristic acid (14:0), lauric acid 12:0), or the combination of lauric acid (12:0) and myristic acid (14:0), especially when the level of trisaturated triglycerides is low. Preferably, the levels of palmitic acid (16:0) and stearic acids (18:0) are also low. As little as 15% by weight or less (e.g., about 10-14.9%) of linoleic acid can be sufficient to minimize the LDL/HDL cholesterol ratio when the diet contains the appropriate levels of myristic, lauric, or lauric+myristic fatty acids.

Thus, even though the invention includes edible fat compositions which include 15% to 45% linoleic acid, surprisingly advantageous dietary fat compositions (and food containing such fat compositions) can be prepared with a PMF hardstock fat such that the fat composition contains less than 15% linoleic acid (e.g., 10-12%, 10-14.9, or 12-14.9%). Such fat compositions also contain from 15 to 45%, 15 to 40, 15 to 30, 20 to 50, 20 to 45, 20 to 40, 20 to 35, or 20 to 30% by weight saturated fatty acids. Preferably the total level of saturated fatty acids does not exceed the just stated levels. Also preferably, palmitic acid (16:0) constitutes no more than 25% of total fatty acids by weight, more preferably no more than 20%, and still more preferably no more than 15, 12, or 10% of the total fatty acids by weight. Stearic acid preferably constitutes no more than 10%, more preferably no more than 9%, 8, 7, 6, 5, 4, or 3% of the fatty acids by weight. Aside from linoleic acid and saturated fatty acids, substantially the remainder of the fatty acid content in the fat composition is preferably oleic acid (18:1) and can also include minor amounts of other saturated, monounsaturated, and/or polyunsaturated fatty acids. In certain embodiments, the specified level of linoleic acid is replaced with a combination of at least 2, 3, or 4 polyunsaturated fatty acids selected from the group consisting of linoleic acid, alpha-linolenic acid, eicosapentaenoic acid (EPA), docosahexaenoic acid (DHA), and any combination thereof, but preferably at least 3, 4, 5, 6, 7, 8, 9, or 10% by weight is linoleic acid.

Certain desirable fat compositions can be prepared by blending different fats having appropriate fatty acid profiles. For example, palm kernel oil can be used to provide myristic and lauric acid. Advantageously, many of the triglyceride molecules in palm kernel oil contain sn-2 unsaturated fatty acids, but nearly all of these are sn-2 oleic acid rather than the more beneficial 18:2 linoleic acid. Based upon 100% by weight of the fatty acids contained in a fat, palm kernel oil commonly contains about 49% lauric acid (12:0), about 17% myristic acid (14:0), about 8% palmitic acid (16:0), about 12% oleic acid (18:1), and about 2-3% linoleic acid (18:2), along with about 2-4% each of other saturated fatty acids (stearic 18:0, capric 10:0, and caprylic 8:0). Oleic acid can be provided, for example, by blending with high oleic sunflower oil, such as that from Cargill Inc. (Minneapolis, Minn.) or the high oleic soybean oil from DuPont. The Cargill high oleic sunflower oil contains approximately 82% oleic acid, 8-9% linoleic acid and 8-9% saturated fatty acids, while the DuPont high oleic soybean oil contains approximately 84% oleic acid, 3% linoleic acid, and 13% saturated fatty acids. If desired, additional linoleic acid can be contributed by adding any of a variety of vegetable oils containing substantial amounts of linoleic acid, e.g., standard or commodity soybean, safflower, sunflower, and/or corn oils, or by adding appropriate amounts of synthetic triglycerides having linoleic acid at the sn-2 position.

In preferred embodiments and as specified more particularly below, the PMF hardstock composition contains substantial levels of a combination of palmitic acid and stearic acid, e.g., at least 55% by weight (the sum of fatty acids totaling 100%). In some cases, the composition also contains a measurable level of myristic acid or of lauric acid or both. Thus, the composition may contain 0.5% or more by weight of either myristic acid or lauric acid or a combination thereof. The composition further contains an appropriate balance of polyunsaturated fatty acids, in particular linoleic acid, usually in a weight ratio of polyunsaturated fatty acids (or linoleic acid) to saturated fatty acids of about 1:1 to 4:1.

Thus, for some embodiments, the ranges for the P/S ratio of 18:2 linoleic acid to total saturated fatty acids are provided as follows. Where ranges of numerical ratios are specified, each number is a ratio in which the denominator is 1.00. In the immediately following ranges, the denominator of 1.00 represents total saturated fatty acids. Thus by way of example, a range of 1 to 4 means that the P/S ratio ranges from 1:1 to 4:1. Accordingly, the presently described ranges of P/S ratios are from 0.5 to 4, 0.5 to 3, 0.5 to 2.5, 0.5 to 2, 0.5 to 1.5, 0.5 to 1, 0.75 to 4, 0.75 to 3, 0.75 to 2.5, 0.75 to 2, 0.75 to 1.5, 0.75 to 1, 0.8 to 3, 0.8 to 2.5, 0.8 to 2, 0.8 to 1.5, 0.8 to 1.2, 0.9 to 3, 0.9 to 2.5, 0.9 to 2, 0.9 to 1.5, 0.9 to 1.4, 0.9 to 1.3, or 0.9 to 1.2, 0.9 to 1.1, 1 to 4, 1 to 3, 1 to 2.5, 1 to 2, 1 to 1.5, 1.5 to 4, 1.5 to 3, 1.5 to 2.5, 1.5 to 2, 2 to 4, 2 to 3, 2.5 to 4, 2.5 to 3; the weight ratio of 18:2 linoleic acid to saturated fatty acids in the edible fat blend composition is at least 0.5, 0.6, 0.7, 0.8, 0.9, 1.0, 1.1, 1.2, 1.5, 1.7, 2.0, 2.5, 3.0, 3.5 or 4.0, or is in a range of 0.5 to 3.0, 0.5 to 2.0, 0.5 to 1.0, 1.0 to 3.0, 1.0 to 2.0, 2.0 to 3.0, or 2.0 to 4.0.

Preferably the fat composition includes a palm mid-fraction PMF hard fat in which the weight ratio of oleic acid (18:1) to the sum of palmitic acid (16:0)+stearic acid (18:0) (i.e., the (18:1):(16:0+18:0) ratio, also known as the O/(P+S) ratio) contained in the PMF fat is in a range from 0.45:1 to 0.75:1; the O/(P+S) ratio is from 0.45 to 0.70, 0.45 to 0.65, 0.45 to 0.60, 0.45 to 0.55, 0.50-0.75, 0.50 to 0.70, 0.50 to 0.65, 0.50 to 0.60, and advantageously approximately 0.50:1±0.05. This ratio of oleic acid÷(palmitic+stearic acid) reflects the amounts of various molecular species present in different palm oil fractions (see Table 14). Thus, a ratio of 0.50:1 is a good indicator that the proportion of DST molecules (such as POP) is beneficially high.

Preferably the fat composition includes a palm mid-fraction PMF hard fat in which the PMF fat has a solid fat content at 35° C. (SFC35° C.) of approximately zero percent, 1%, or at most 2-3% by weight, and an SFC at 20° C. (SFC20° C.) of at least 45% by weight but advantageously considerably higher, such as 80%-90% by weight; the (SFC20° C.) of the PMF ranges from 45% to 95% by weight, 45% to 90%, 45% to 85%, 50% to 95%, 50% to 90%, 50% to 85%, 55% to 95%, 55% to 90%, 55% to 85%, 60% to 95%, 60% to 90%, 60% to 85%, 65% to 95%, 65% to 90%, 65% to 85%, 70% to 95%, 70% to 90%, 70% to 85%, 75% to 95%, 75% to 90%, 75% to 85%, 80% to 95%, 80% to 90%, 85% to 95%, or 85% to 90%.

Preferably the fat composition includes a palm mid-fraction PMF hard fat in which the majority, i.e., more than 50%, of the triglyceride molecules in the PMF hard fat contain either oleic acid or linoleic acid ester-linked at the sn-2 position of the glyceride molecule, and contain either palmitic acid or a combination of palmitic and stearic acids at the sn-1 and sn-3 glyceride positions. This majority of triglyceride molecules advantageously ranges upward from 50% to at least 55%, 60%, 65%, 70%, 75%, 80%, 85% or even as high as approximately 90%.

Preferably the proportions of fatty acids in the overall fat blend composition are substantially determined by the choice of unsaturated vegetable oils selected for the composition, where the PMF hard fat contributes a maximum of 24% by weight of the total fat (or approximately 24% by weight of the fatty acids summed to 100%). Since advantageous PMF hard fats contain about 64% SFA per 100% total, the maximum SFA contribution to a blended fat composition is limited to approximately 0.24×64%=15% SFA. Of this 15% SFA, approximately 90% (i.e., 14%/15%) is palmitic acid. Advantageous PMF hard fats contain high levels of the POP triglyceride, and such PMFs typically contain approximately 58% palmitic acid and 30% oleic acid, so that with a composition limit of 24% by weight PMF, the PMF can contribute only approximately 0.24×58% palmitate=14% palmitate and 8% oleate with much lesser amounts of other fatty acids in the fat composition. The remainder of the fat composition totaling 76% or more can be advantageously constituted of unsaturated vegetable oils contributing high levels of monounsaturated fatty acids (e.g., canola oil, high oleic canola oil, high oleic sunflower, high oleic safflower, high oleic soybean oil) and/or high levels of polyunsaturated fatty acids (e.g., regular sunflower oil, regular safflower oil, or regular soybean oil) or a combination of both. Given these compositional limits, tests including trial and error experimentation has provided useful solid fat blends containing beneficially reduced levels of SFA (e.g. less than 20% of the 100% fatty acid total) for use in margarines, table spreads and shortenings blends. Furthermore, these blends containing low levels of SFA can be formulated with approximately equal or up to three- or four-fold greater amounts by weight of polyunsaturated fatty acids (as 18:2 linoleic acid) to offset and balance any cholesterolemic effect of SFA.

Preferably the PMF hard fat includes approximately 60% by weight palmitic acid out of a total of 100% fatty acids (in most cases it contains between 50% and 60% by weight palmitate); preferably the PMF hard fat includes 3% to 7%, 4% to 6% or approximately 5%±1% by weight stearic acid; preferably the PMF hard fat includes 2% to 8%, 3% to 7%, 3% to 6%, 3% to 5% or 4%±2% by weight of linoleic acid.

Preferably the PMF hard fat includes approximately 30%-40% by weight oleic acid out of a total of 100% fatty acids; preferably the PMF contains between 32% and 37% by weight oleate).

In certain embodiments, the combined blended fat composition includes between 25% and 65% oleic acid out of a total of 100% fatty acids; preferably the blended fat composition contains approximately 15% to 30% by weight or preferably 20%±5% by weight SFA and between 20% and 50% polyunsaturated fatty acids as linoleic acid, leaving the approximate 25%-65% balance for oleic acid as monounsaturated fatty acids. In other cases, a 15%-20% by weight level of SFA may be balanced by an equal amount, or up to a two-fold excess (30%-40%) of polyunsaturated fatty acids as linoleic acid, leaving a balance of either approximately 60%-70% oleic acid at the "high end" or a balance of approximately 40%-55% oleic acid at the "lower end". If the level of SFA is increased to 25% by weight, with between an equal or a two-fold excess of polyunsaturated fatty acids (25%-50% linoleic acid), the remaining balance of oleic acid would range from approximately 25% to 50% by weight.

The fat composition includes at least 5, 10, 15, 20, 25, 30, 35, 40, 50, 60, or 70% by weight oleic acid; the fat composition includes 15 to 45% linoleic acid, with, for example, at least 15, 17, 20, 25, 30, 35, 40% or 45% (or in a range defined by taking any two of the just specified values as end points of the range) or with polyunsaturated fatty acids in a range as just specified for linoleic acid in which the ratio of linoleic acid (18:2) to alpha-linolenic acid (18:3) is at least 1.0, 1.5, 2.0, 3.0, 4.0, 5.0, 7.0, or 10.0:1.

In certain embodiments, the fat composition includes 15 to 45%, 15 to 35, 15 to 30, 15 to 25, 15 to 20%, 20 to 45%, 20 to 40, 20 to 35, 20 to 30, 20 to 25%, 25 to 45%, 25 to 40, 25 to 35, 25 to 30, 30 to 45%, 30 to 40, 30 to 35%, 35 to 45%, 35 to 40%, or 40 to 45% linoleic acid, or less than 45% linoleic acid; and/or the composition includes no more than 45, 40, 35, 30, 25, 20 or 15% of palmitic acid or the combination of palmitic plus stearic acids, e.g., 15 to 20, 15 to 25, 15 to 30, 15 to 35, 15 to 40, 15 to 45, 20 to 25, 20 to 30, 20 to 35, 20 to 40, 20 to 45, 25 to 30, 25 to 35, 25 to 40, or 25-45% of palmitic acid or the combination of palmitic plus stearic acids; the fat composition includes at least 15, 20 25, 30, 35, or 40% by weight palmitic acid or the combination of palmitic and stearic acids, or contains at least the specified percentage of each of palmitic acid and stearic acid up to a total of 15%, 20, 25, 30, 35, 40, or 45% by weight.

In certain cases, in addition to the specified level of 18:2 (n-6) linoleic acid, the fat composition contains one or more other polyunsaturated fatty acids taken singly or in any combination from the group of omega-3 polyunsaturated fatty acids (providing a combination of 2, 3, or 4 polyunsaturated fatty acids) selected from the group consisting of alpha-linolenic acid, eicosapentaenoic acid (EPA), and docosahexaenoic acid (DHA), preferably such combination includes 5-7, 5-10, 5-12, 5-14.9, 5-20, 5-30, 5-38, 8-10, 8-12, 8-14.9, 8-20, 8-30, 8-38, 10-12, 10-14.9, 10-20, 10-30, 10-38, 12-14.9, 12-20, 12-30, 12-38, 15-30, or 15-38% linoleic acid, or other percentage of linoleic acid as specified above.

In certain embodiments, specifically including those embodiments specified above, the fat composition includes no more than 45% saturated fatty acids (e.g., from 15 to 45% 15 to 40, 15 to 30, 15 to 25, 15 to 20, 20 to 45, 20 to 40, 20 to 35, 20 to 30, 20 to 25, 25 to 45, 25 to 40, 25 to 35, 25 to 30, 30 to 45, 30 to 40, 30 to 35, 35 to 45, 35 to 40 and 40 to 45% by weight saturated fatty acids); palmitic acid (16:0) constitutes no more than 40, 35, 30, 25, 20, 15, 12, or 10% by weight of the total fat composition; stearic acid constitutes no more than 10, 9, 8, 7, 6, 5, 4, 3, or 2% of the fat by weight; palmitic acid plus stearic acid constitutes no more than 45, 40, 35, 30, 25, 20, 17, 15, 12, 10, 9, 8, 7, 6, or 5% of the total fat composition. For the preceding, substantially the remainder of the fatty acids in the fat composition are preferably oleic acid (18:1) and polyunsaturated fatty acids, usually primarily linoleic acid, and/or in addition to the specified level of linoleic acid there is present a combination of polyunsaturated fatty acids as indicated above. Preferably when other polyunsaturated fatty acids are included, the linoleic acid is at least 15%, 20, 25, 30, 35, 40 or 45% by weight of the total fat, e.g., 15%-45% by weight.

In particular embodiments, the edible fat composition includes 15% to 45% by weight linoleic acid or other percentage within this range as specified above, 15% to 40% by weight saturated fatty acids (SFA) consisting principally of palmitic acid and stearic acid, and 30% to 70% by weight oleic acid or a combination of monounsaturated fatty acids which are primarily oleic acid, where the total of the fatty acid weight percentages is 100%.

In particular embodiments, consistent ingestion of the edible fat blend compositions hardened with a PMF fat as described herein (e.g., as part of a daily diet) may decrease TC or total cholesterol, LDL cholesterol, and/or increases the fraction of total cholesterol which is HDL cholesterol (or decrease TC/HDL), and/or decreases serum triglycerides. For advantageous embodiments, consistent ingestion of the edible fat composition results in two or more of the just specified effects taken in any combination.

In certain embodiments, no more than 5, 4, 3, 2, or 1% by weight of the triglyceride molecules containing saturated fatty acids in the blended fat composition are tri-saturated triglycerides;

In certain embodiments, the fat composition contains no triglycerides which have been subjected to partial hydrogenation or contains no more than 0.1, 0.2, 0.3, 0.5, 0.7, 1 or 2% by weight triglycerides which have been subjected to such hydrogenation.

In certain embodiments, the blended fat composition is a balanced fat composition in which the pairwise weight ratios between saturated fatty acids, monounsaturated fatty acids, and polyunsaturated fatty acids is not greater than 3, 2.5, 2, 1.9, 1.8, 1.7, 1.6, 1.5, 1.4, 1.3, 1.2, 1.1, 1.0, 0.9, 0.8, 0.7, 0.6, 0.5, or 0.4 or is in a range defined by taking any two of the just-specified values as end points of the range; the dietary fat is an essentially unmodified blend of natural fats; the dietary fat also includes about 10 to 24%, 10 to 22%, 10 to 20%, 10 to 18%, 10 to 16%, or 15 to 24%, 15 to 22%, 15 to 20%, or 15 to 18% by weight of PMF hard fat having a Mettler drop point higher than room temperature, e.g, about 26, 28, 30, 32, 34, 38, 42 or 45 degrees C; and the PMF hard fat also can include a supplemental saturated fat containing a high concentration of disaturated triglycerides, e.g., cocoa butter or varieties of natural soybean oil containing high stearic acid contents from a high-stearic acid soybean variety, or a high palmitic acid content fat, e.g., palm oil, or any combination of the just specified fats or oils, but not stearin fats such as palm stearin or palm kernel stearin that contain high levels of trisaturated triglycerides; the blended fat composition has a Mettler drop point above room temperature, e.g., above 26, 28, 30, 32, 35, or 38 degrees C.

In particular embodiments, the blended fat composition is a fat blend containing or containing about (within ±5, 10, 20, or 25% of the oil and fat percentages) the oil and fat combination described herein in Tables 8 and 9; the fat composition is an oil and fat blend containing or containing about (within ±5, 10, 20, or 25% of the fatty acid composition percentages) the fatty acid composition described herein in Tables 8 and 9.

In preferred embodiments, the fat composition is substantially free of animal fat or contains no more than 1, 2, 3, 4, 5, 6, 7, 8, 9, or 10% by weight animal fat (e.g., lard, and/or tallow, or a fat fraction thereof), with the exception of butterfat. While it is preferable for the fat composition to be substantially cholesterol-free, the fat composition may contain up 50% by weight butter and therefore contain up to half the cholesterol level found in butter, if butter is the cholesterol source (butter containing approximately 215 mg cholesterol per 100 g). This exception is made in view of the ability of the present fat compositions to at least partially compensate for the presence of dietary cholesterol. Therefore, in certain embodiments, the fat composition includes some cholesterol, e.g., at least 0.01, 0.02, 0.03, 0.04, 0.05, 0.07, 0.10, or 0.12% by weight or is in a range defined by taking any two of the just-specified values as inclusive endpoints of the range.

The fat compositions described above can be employed to limit VLDL, LDL, total cholesterol, and total triglycerides in serum or plasma, even in the presence of dietary cholesterol. A fat composition of the invention is considered to "reduce" an LDL-cholesterol level or a total cholesterol level if any reduction in the level is obtained. In certain embodiments, a reduction in the level of at least 5%, at least 10%, or at least 15% is obtained. Coronary heart disease, and both vascular and general health in humans and other mammals can be improved if the plasma levels of total cholesterol and LDL are reduced, while the ratio of LDL to HDL is also reduced, and the level of HDL is increased. There is also a general consensus, that a low level of plasma triglycerides is beneficial, and that if the level of very low density lipoprotein (VLDL) also can be reduced, then the triglyceride and lipoprotein levels are beneficially regulated because HDL is generated, in part, during catabolism of VLDL.

The inventors are unaware of any previous nutritional study on lipoprotein metabolism in which PMF and palm stearin were compared side-by-side with equal percentages of energy provided by fat, and where an adequate and equal amount of 18:2 was present in both diets to validate the comparison between saturated fatty acid exchanges. This is an important point because intake of 18:2 significantly controls all fat metabolism (Hayes, K. C., Khosla, P. Dietary fatty acid thresholds and cholesterolemia. FASEB J. 6:2600-07, 1992), and it is well established that changing any one of numerous nutritional or physiological variables in a nutritional fat study can substantially alter the lipoprotein profile obtained from a group of human subjects or animal models. Thus, changing more than one variable at a time between diets precludes accurate interpretation of how each variable might contribute to the response observed. These variables include, but are not limited to: (a) the age and gender of the animals, (b) the percent of dietary calories being supplied by fat, as well as by the test fat in question, (c) the percentages of energy supplied by each saturated fatty acid and polyunsaturated fatty acids (assuming monounsaturated fat is maintained constant), (d) the level of cholesterol supplied in the diet, (e) the daily total calorie intake, and (f) the sources and relative amounts of protein, carbohydrate and fiber in the diet, including the amount of plant sterols that may be present. The inventors are also not aware of any nutritional study in which the effects of palm stearin, PMF, and palm olein on lipoprotein metabolism were compared directly in the same study.

Separated fractions of palm oil have been considered essentially "unhealthy" and their associated lipoprotein metabolism has been largely ignored for several reasons. While PMF has been commercially available for many decades, it is relatively expensive compared to whole palm oil and is available in more limited supply than palm oil. PMF has been principally utilized in confection manufacture as a less costly substitute for cocoa butter. Moreover, palm oil subfractions as well as palm kernel oil have been considered hypercholesterolemic and to be largely avoided, particularly if simple palm oil (which contains predominantly palmitic acid) is also available as an alternative and less costly saturated fat. Given this history concerning the hyperlipidemic effects of palm fat fractions such as palm stearin, the present invention is surprising and unexpected. It would not have been expected prior to the invention that PMF, with its high level of solid fat (SFC) at room temperature could function as a healthier dietary saturated fat than palm stearin. Yet this has been demonstrated by the gerbil studies provided in the examples presented below (see, e.g., results obtained with Diet 711 compared to Diet 710, and Diet 722 compared to Diet 719).

The saturated fatty acids in desirable hardening fats for this invention are palmitic acid and/or stearic acid, particularly in the form of symmetrical disaturated triglycerides with the configurations POP, POS, or SOS, where "P" refers to a palmitate ester, "O" refers to an oleate ester, and "S" refers to a stearate ester. Some, most, or substantially all of the oleate ester can be replaced with linoleic acid moieties. In some cases it is desirable to use oil fractions that are enriched in the disaturated triglycerides and reduced in the trisaturated triglycerides, and often reduced in low melting point triglycerides such as triglycerides which contain one or no saturated fatty acids. In addition to PMF as described herein, some useful hardening fats of these types are referred to as "cocoa butter equivalents" or "CBEs", and include, for example, palm oil, cocoa butter, shea butter, sal fat, illipe fat, kokum fat, mango kernel fat, and mid-melting fractions thereof and/or combinations thereof. Persons familiar with CBEs will recognize a variety of CBEs with a range of physical properties that can be prepared using different blends of fats and/or oils, or even synthetic triglycerides, having high disaturated triglyceride content. Persons skilled in preparing edible oil fractions will readily understand how to control the compositions of such fractions by controlling the fractionation conditions (e.g., melting or freezing separation temperatures used) to provide a desirable oil fraction high in disaturated triglycerides and low in trisaturated triglycerides.

To have a measurable impact on lipoprotein metabolism, the dietary fat blend should be used periodically or regularly as a nutritional fat. That is, the dietary fat blend can be used in the diet as a nutritional fat from time to time, and preferably on a regular basis, such as at least daily, or more than once daily, or at least several times per week, such as 2, 3, 4, 5, or 6 times per week. The schedule of consumption of the nutritional fat on a regular basis may vary somewhat according to the needs or desires of the subject.

Many processed food products can incorporate the PMF-containing fat blend compositions taught herein. These include baked and fried foods, margarines, table spreads and shortenings that are hardened, i.e., rendered solid or semi-solid at room temperature (i.e., about 20° C.) with added levels of from approximately 10% to 24% by weight of PMF hardstock fat, based on the food item's total fat content equaling 100%. PMF typically contains a certain level of trisaturated triglyceride molecules. These are shown herein below to be cholesterolemic. Consequently, it is important to minimize the total amount of trisaturated triglycerides added to a blended fat via the addition of PMF by selecting a suitably fractionated PMF. Such a PMF should contain a maximum level of disaturated triglycerides and a minimum level of trisaturated triglycerides. The PMF should be combined and supplemented in a blended fat composition with at least one unsaturated vegetable oil to provide an amount of polyunsaturated fatty acids as 18:2 linoleic acid that is approximately equal to, or greater than the total weight of saturated fatty acids contained in the blended composition. Previously developed dietary fat blends can reduce plasma LDL-cholesterol levels in humans and improve their lipoprotein profiles using palm oil blended with polyunsaturated vegetable oils (see U.S. Pat. Nos. 5,578,334, 5,843,497, 6,630,192, and 7,229,653). Those fat blends use a weight ratio of polyunsaturated (P) linoleic acid (18:2), to total saturated (S) fatty acids of approximately 1:1. However, by using PMF as a hardstock fat according to the present invention, the useful P/S ratio range is considerably broader and higher, extending from approximately 1:1 to approximately 3:1. This is because the present invention indicates that low levels of certain PMF preparations are unexpectedly effective at solidifying liquid vegetable oils. Instead of requiring 25%, 30%, 35% and higher levels (by weight) of PMF included in blended fat compositions, levels as low as 15% and 20% by weight PMF can be effective. Therefore, greater proportions of polyunsaturated fatty acids can be added relative to saturated fatty acids in the PMF fat blends of the present invention.

In certain embodiments, the prepared food product is a cooking oil/fat, an oil spread (e.g., a margarine or table spread), a shortening, a salad dressing; a barbecue or dipping sauce or other condiment, a baked good (e.g., bread, tortilla, pastry, cake, cookie, or pie), or a dairy product (e.g., a milk, yoghurt, or cheese); in certain embodiments, the present edible fat composition is 2 to 10, 5 to 15, 10 to 30, 30 to 50, or 50 to 100% by weight of the prepared food product.

Another related aspect concerns a human diet or diet formulation which is intended for, or which when regularly ingested has the effect of decreasing the LDL cholesterol, increasing the fraction of HDL versus total cholesterol, reducing the triglyceride level, and/or decreasing the LDL/HDL concentration ratio in human plasma, and/or decreasing the fasting blood glucose concentration, in which a substantial amount, e.g., 10 to 100%, 10 to 90%, 10 to 80%, 10 and 75%, 10 to 50%, 20 to 100%, 20 to 80%, 20 to 60%, 30 to 100%, 30 to 80%, 50 to 100%, or 50 to 80% by weight of the daily dietary fat is provided by the edible fat composition of the first aspect, or an embodiment thereof, or is otherwise described herein for the present invention.

In particular embodiments, a human diet formulation is provided in packaged liquid form or in other packaged form (for example, packed in single meal or daily meal plan form), e.g., indicated for nutritional supplementation or replacement, such as for elderly patients or patients with compromised digestive systems, and/or for improvement of a patient's lipoprotein profile.

An aspect of the invention is a method of aiding a person to decrease total cholesterol levels, increase the percentage of HDL cholesterol as a fraction of total cholesterol, decrease the LDL cholesterol, decrease triglyceride level, and/or decrease the LDL/HDL cholesterol ratio in their plasma, and/or decrease the fasting blood glucose concentration. The method involves providing a dietary fat composition according to the first aspect above or otherwise described herein for the present invention. Preferably the dietary fat composition is substantially cholesterol-free or alternatively low in cholesterol.

Preferably the dietary fat composition is a blend of natural fats and oils and does not contain trans-fatty acids.

In particular embodiments, the edible fat blend composition is as described for the first aspect above or an embodiment thereof or otherwise described herein for the present invention; the edible fat blend composition is provided at least in part or primarily in one or more prepared foods or diets or diet formulations (e.g., liquid diet formulations) as specified for an aspect above or an embodiment thereof.

In certain embodiments, the person or subject consuming a nutritional fat composition of the invention suffers from high TC, high LDL cholesterol and/or from a high TC/HDL cholesterol ratio, and/or a low percentage of HDL cholesterol as a percentage of total cholesterol in their plasma.

Similarly, another related aspect concerns a method of increasing the concentration or percentage of HDL cholesterol relative to total cholesterol, decreasing the LDL cholesterol, and/or decreasing the TC/HDL or LDL/HDL cholesterol ratio, decreasing triglycerides, and/or decreasing the fasting blood glucose concentration, in the plasma of a human subject. The method involves consistently ingesting a dietary fat composition of the first aspect above or an embodiment thereof or is otherwise as described herein for the present invention.

A further aspect concerns a method of preparing an edible fat blend composition by blending at least one PMF hardstock fat with at least one other edible oil (e.g, 2, 3, or 4 different oils) in proportions such that a blended edible fat as described for the first aspect above or an embodiment thereof is formed. Preferably the blended edible fat is substantially cholesterol-free.

In certain embodiments, the blended edible oil formed is semi-solid at 25, 27, 30, 32, or 35 degrees C.

In some embodiments, the fat composition is formed by blending a high oleic vegetable oil (such as canola oil, high oleic canola oil, high oleic sunflower oil, high oleic safflower oil or high oleic soybean oil) with at least one PMF fat.

A further aspect is a method for limiting plasma triglycerides (TG), LDL cholesterol, and/or VLDL cholesterol, and involves providing for ingestion a dietary fat that is solid or semi-solid at 20° C., that includes between 10% and 24% by weight PMF hardstock fat.

In some embodiments, the dietary fat provides from 10 to 50%, 10 to 40%, 10 to 30%, 20 to 50%, 20 to 40%, 20 to 35%, 20 to 30%, 25 to 50%, 25 to 40%, 30 to 50%, 30 to 40%, or 35 to 45% of the total dietary calories in the diet; regular ingestion of the dietary fat reduces plasma total cholesterol (TC) without significantly reducing HDL; regular ingestion of the dietary fat reduces plasma VLDL and/or LDL cholesterol without significantly reducing HDL; regular ingestion of the dietary fat reduces plasma triglycerides (TG) without significantly reducing HDL; regular ingestion of the dietary fat significantly reduces VLDL and TC without significantly reducing HDL; regular ingestion of the dietary fat reduces the LDL/HDL ratio; and/or the specified reductions occur in the presence of dietary cholesterol.

In desirable cases, the dietary fat is a balanced fat composition in which the pairwise weight ratios between saturated fatty acids and polyunsaturated fatty acids is not greater than 2, 1.9, 1.8, 1.7, 1.6, 1.5, 1.4, 1.3; the dietary fat is an essentially unmodified blend of natural fats; the dietary fat also includes about 10 to 24%, 10 to 20%, 10 to 15%, 15-22%, 15 to 20%, 15 to 18% by weight of a PMF hard fat having a Mettler drop point of about 30, 32, 35 or 40 degrees C.; and/or the hard fat includes 10%, 20%, 30%, 40% or 50% palm oil and/or a high-stearic acid content fat such as cocoa butter that does not contain substantial levels of trisaturated triglycerides; the dietary fat composition has a Mettler drop point above 26 degrees C., e.g., 28, 30, 32, 35, 37, or 40 degrees C.

In some embodiments, the dietary fat is in the form of a margarine, a spread, a shortening, or a frying oil composition; the dietary fat is included in a prepared food, e.g, baked goods, filled milk, mayonnaise, salad dressing, or filled yoghurt, or is included in a complete diet composition.

A related aspect concerns a method of limiting (which may be reducing) the concentration of TC, LDL and/or VLDL cholesterol in the plasma of a human subject consuming a diet containing cholesterol, by consistently ingesting a dietary fat as specified for one of the preceding aspects, where the dietary fat provides 10 to 50 percent of the total dietary calories of the subject (or other percentage of the dietary calories as specified for an aspect above).

In particular embodiments, the dietary fat is as specified for an embodiment of the preceding aspect; the dietary fat is provide in one or more prepared foods; the dietary fat is provided in a complete diet composition; the dietary fat provides 20 to 50%, 30 to 50%, 20 to 40%, 25 to 40%, or 35 to 45% of the dietary calories of the subject; the dietary fat is a blend of at least two, three, or four fats and/or oils.

Also in particular embodiments, the animal or subject ingesting the nutritional fat composition is a mammal, a livestock animal such a porcine, a bovine (typically cattle), an ovine (such as domestic sheep), a caprine (such as domestic goat), an equine, a canine (such as a domestic dog), a feline (such as a domestic cat), or a human.

In a related aspect, the invention further concerns a blended fat composition (i.e., a blend of at least two fats and/or oils) as described in the first aspect or otherwise described herein for this invention.

In certain embodiments, the dietary fat of the present invention provides 10 to 50%, 10 to 40%, 10 to 30%, 20 to 50%, 20 to 40%, 20 to 30%, 25 to 50%, 25 to 40%, 30 to 50%, or 35 to 45% of the dietary calories in the diet.

Likewise, the invention concerns a prepared food product which includes a dietary fat as specified in any of the preceding aspects; the prepared food product may contain cholesterol, e.g., at level as specified in an aspect above.

In certain embodiments, the prepared food product is a baked good, a filled milk, a mayonnaise, a salad dressing, or a filled yoghurt.

Yet another aspect concerns a method of preparing a dietary fat, involving blending an edible fat or oil with at least one PMF hardstock fat, thereby forming a blended dietary fat composition as described for an aspect above or otherwise described herein for the present invention.

In certain embodiments, the dietary fat is as specified for an embodiment of any of the preceding aspects.

In particular embodiments, saturated fatty acids in the blended dietary fat are largely provided by PMF fat or about 20 to 40, 25 to 45, 30 to 50, 35 to 55, 40 to 60, 50 to 70, or 60 to 80% by weight of the saturated fatty acids in the fatty acid composition are provided by PMF fat; the blended dietary fat is a chemically unmodified blend of natural fats and/or oils.

Palmitic and Stearic Acids Provided by DSTs from PMF

For achieving the cholesterol-lowering benefits as described herein, between approximately 5% and 24% by weight, and more typically 10%-22% by weight, or 10%-20% by weight, or 5%-15% by weight, or 8%-18% by weight of a suitably selected PMF fat preparation rich in DST, i.e., containing between 50% and 95% DST, and suitably limited amounts of both TST and MST (less than 5% by weight TST and preferably less than 4% or 3% TST, and less than 25% by weight MST and preferably less than 20%, 15% or 10% MST) should be combined with an unsaturated vegetable oil (such as canola oil, soybean, sunflower, safflower corn, peanut, or cottonseed oil) and used as a principal source of dietary fat. Mammalian feeding experiments that utilize the gerbil animal model are described herein below. These tests have proven highly predictive of the human lipoprotein response to dietary fats. When PMF-hardened vegetable oils were provided as the principal source of dietary fat over the course of 4 weeks, plasma LDL-cholesterol levels were surprisingly diminished compared to animals fed essentially the same amount of the same fatty acids (palmitate and stearate) provided by palm stearin rather than PMF. PMF fats were utilized in which most TST had been removed by fractionation to enhance the mammalian plasma lipoprotein response to DSTs, e.g., POP, PLP and POS molecules. Commercial palm mid-fractions are so-named because they crystallize (or remelt) at an intermediate or "mid-temperature" between the lower melting olein fractions (rich in monosaturated triglycerides or MSTs) and the higher melting stearin fractions (rich in TSTs). Evidence provided below indicates that by replacing an amount of palmitic and stearic acids provided in a palm stearin fraction with an approximately equal amount of these fatty acids provided in PMF fat, the lipoprotein profile is improved.

Use of PMF in Confections and Margarine

PMF has found uses in the confectionary industry, in which costly cocoa butter has been replaced with less costly PMF that has similar melting characteristics and mouth feel. However, PMF is still 2-3 times more costly than palm oil so that its use outside confectionary applications has been limited. Unless there is a strong reason for using PMF, a more cost-effective palm oil or a suitable amount of trisaturated palm stearin would be used in its place. With regard to margarine use (see Background above), Moran and other investigators describe water-in-oil emulsions containing PMF. For example Moran in U.S. Pat. No. 4,115,598 describes table spreads containing 60% of an aqueous phase and 40% of a fat phase, in which the fat phase contains higher levels, i.e., 25%-30% by weight, of PMF fat that is combined with 70%-75% sunflower oil. Such water-in-oil emulsions as confections and margarines can be formulated as nutritional fat compositions according to the present invention.

Design of Blended Fat Compositions

Natural palm oil stearin (PS) fractionated from palm oil contains a substantial proportion of trisaturated triglycerides (tripalmitin), i.e., PPP, which has an elevated melting point and, depending upon the level used, now appears to be a cholesterolemic fat based upon the gerbil data in Table 3 below (cf. TC and LDL-C for Diet 710 versus Diet 711). These factors limit the amount of palm stearin that can be added to vegetable oil without the resulting mixture acquiring a waxy mouth feel and/or being deemed unhealthy.

Thus, if a solid fat content (abbreviated "SFC") of approximately 10% or more measured at room temperature is required to produce a firm table spread, and a level of PS in excess of 5% produces a waxy mouth feel, then the level of PS that may be useful is limited. On the other hand, advantageously blended fat compositions can be formulated containing either low or moderate levels (e.g., 5%-15% or even 20%-24% by weight) of a palm mid-fraction solid fat (abbreviated PMF) that is rich in disaturated triglycerides (DSTs). It is also possible to design blended fat compositions in which limited amounts of PS (e.g., 3%-5%) are combined with moderate levels of PMF (e.g., 10%-15%). PMF can be fractionated in substantial quantities from natural palm oil. It is rich in the POP triglyceride structure in which the sn-1 and sn-3 isomeric positions are principally occupied by palmitic acid and the sn-2 position is occupied by oleic acid, and to a lesser degree linoleic acid. Approximately 46% of palm oil triglycerides are DSTs including 30% POP, 9% PLP and 7% POS (P=palmitate, O=oleate, L=linoleate and S=stearate). Interestingly, with cocoa butter in which the stearic acid content (33%) is much higher than in palm oil (4%), the DST population shifts to predominantly SOS and POS where one or both palmitic acids in POP are replaced by stearic acid. As for selecting a commercial PMF material with a useful SFC level, that level should be greater than 50% at 20° C., and is preferably as high as 75%, 85%, or even higher at 20° C., yet is essentially 0% at 35° C. The latter number is important together with the melting point for mid-fraction palm oil DSTs of approximately 32° C. because they assure that a table spread or shortening fat that is solid at room temperature will also melt in one's mouth and not produce a waxy mouth feel. One example of a DST-rich palm mid-fraction hard fat (PMF) is Palmel 35 produced by Fuji Vegetable Oil Inc. (Savannah, Ga.). It has a remarkably elevated SFC value of 86% at 20° C. and a melting point (Mettler Drop Point) of 32° C.

Hardening Efficiencies for Different Solid Fats

Since a major objective of the present invention is to form natural fat blends that are solid at room temperature using a minimum but sufficient amount of saturated fatty acids, an "efficiency factor" at 20° C. (abbreviated "EF") is herein defined for a saturated fat that is solid at 20° C. The EF value for the fat is calculated from the ratio of the fat's solid fat content at 20° C. (SFC) to the fat's percentage of saturated fatty acids (% SFA), and provides a good indication of the relative ability of saturated fatty acids in a particular fat to harden a vegetable oil at 20° C. In the interest of limiting the level of SFA in fat blends and thereby limiting plasma TC, VLDL and LDL cholesterol levels, solid fats that possess increased EF values have been tested. In this regard, palm stearin (PS) contains principally trisaturated triglycerides, and is an interesting example. A palm stearin product fractionated by Fuji Vegetable Oil, Inc. and having an iodine value of 30 has a melting point (Mettler Drop Point) of 56° C. With a SFC of approximately 70% for the PS at 20° C. and SFA content of 71%, the EF is approximately 1. By comparison, a PMF product (also from Fuji) that is rich in disaturated triglycerides is known as Palmel 35 (iodine value of 34), has a SFC at 20° C. of 86% with a SFA of 64%. Therefore, the resulting EF is 86%/64%=1.34. Again, by comparison, the EF for regular whole palm oil (SFC=20-25% at 20° C. and SFA content=51% by weight) is only 0.40-0.50. This considerably lower EF value for palm oil compared to PMF (cf. 0.5 versus 1.34) would require the use of much larger amounts of palm oil and higher concentrations of cholesterolemic SFA to solidify a liquid vegetable oil when compared to PMF and/or PS.

Disaturated Versus Trisaturated Solid Palm Fat Fractions as Hardstock Fats

Over recent years, a combination of monosaturated, disaturated and trisaturated triglycerides provided in palm oil have proven useful for hardening liquid vegetable oils. There are specialized food applications that require the use of one palm oil fraction or another, e.g., for reasons of physical stability, chemical stability, melting point or texture. However, when more than one palm oil fraction is suitable for use in a food product such as a shortening, margarine, or table spread, Applicant hypothesized that one palm fraction might prove healthier, i.e., less cholesterolemic, than another for the usage levels deemed functional and appropriate for a particular product application. Accordingly, given the different EF values for PS and PMF (approximately 1.0 versus 1.3 respectively), it would be instructive to compare the mammalian lipoprotein responses to each of these different solid fat fractions and determine whether one fat is less cholesterolemic than another. To make the comparison valid, approximately equal amounts of SFA from each of these palm fat fractions should be fed to test animals (e.g., gerbils) along with equal amounts of PUFA to maintain the P/S ratio in the diet approximately constant.

The rationale for comparing the lipoprotein response to dietary intake of PS and PMF is as follows: PS contains largely trisaturated and disaturated triglycerides while PMF contains primarily disaturated triglycerides. Therefore, if the dietary level of SFA is kept constant, the number of trisaturated PS molecules being ingested will be only approximately ⅔ as great as the number of disaturated PMF molecules. On the other hand, disaturated PMF triglyceride molecules contain mainly a monounsaturated fatty acid, oleic acid, in the sn-2 molecular position. This fatty acid would persist in the monoglyceride molecule after digestive lipase enzymes have cleaved fatty acids at the sn-1 and sn-3 positions, and might be less cholesterolemic than the corresponding monoglycerides from PS digestion. While alternative hypotheses may be offered, a mammalian animal model feeding experiment with lipoprotein analysis or a human clinical study is the only meaningful method for determining whether PS or PMF is a healthier hard fat when it is combined with one or more suitable liquid vegetable oils. The gerbil has proven to be an excellent model over many years of testing for predicting human lipoprotein responses to fats.

Palm stearin fractions from palm oil contain approximately 71% by weight saturated fatty acids with a SFC value at 20° C. of approximately 70%. Therefore, the EP is 70%/71%=0.99. This number is surprisingly less than the 1.34 value for PMF Palmel 35 described above. With an elevated melting point ranging between approximately 54° C. to 62° C. compared to 31° C. to 33° C. for the PMF, the palm stearin may contribute undesirable waxy mouth feel if more than 5% by weight of the stearin is added to a vegetable oil. While interesterified palm oil (IE palm oil) prepared, for example, using palm olein and exemplified by SansTrans™ HF (Loders Croklaan, Channahon, Ill.) has a useful intermediate melting point of 38-44° C., the SFC at 20° C. for this IE vegetable oil is only approximately 30%. While this is substantially higher than that of both native palm olein and palm oil, lipoprotein metabolism may be undesirably altered by synthetic rearrangement of fatty acids in the triglyceride molecule. This alteration is suggested in Table 3 where TC and LDL cholesterol levels for IE palm olein are compared with those for native palm olein. While statistical significance was not achieved, all of the lipoprotein indices trend downward for the IE palm olein compared to the native product. With regard to further advantages accompanying the use of PMF hard fat, Applicant shows (Table 3) that PMF as a hardstock fat is less cholesterolemic on a gram for gram basis than palm stearin used in hardening many vegetable oils for producing shortenings and table spreads. This discovery was made using the gerbil mammalian model system that has proven to be a reliable indicator of human lipoprotein metabolism. Also, PMF exhibits little or no waxy mouth feel owing to its melting point (approximately 32° C.) that is below the temperature of the human mouth.

In still further advantageous compositions, a beneficial balance between the sum of palmitic acid plus stearic acid (representing most of the total saturated fatty acids in palm oil and PMF) and the amount of unsaturated fatty acids as 18:2 linoleic acid in the fat composition are provided. Notably, it was discovered that the effective level of linoleic acid in an edible fat composition can be quite low (e.g., 5, 6, 7, or 8% by weight or more) when the oil contains sufficiently low levels of cholesterolemic components (e.g., trisaturated triglycerides) which, if elevated, could promote formation of LDL cholesterol or otherwise undesirably impact the relative levels of the various lipoprotein classes and/or total triglycerides. However, the effective level of linoleic acid required for balancing saturated fatty acids is higher when the level of trisaturated triglycerides and/or other LDL-promoting components are higher. These compositions are further advantageous in compensating for dietary cholesterol.

EXAMPLES

Example 1

Dietary Fat Testing Protocol

The following procedure was used as a model system to evaluate the effects of different dietary fat compositions. The procedure is similar to that described in Hayes et al., 2004, J Nutr 134:1395-1399). The model can be used to determine the effects of nutritional fat or oil compositions on plasma lipid profile, adipose deposition, and blood glucose levels. The gerbil model has been confirmed to mimic human plama lipoprotein and total cholesterol responses to dietary fat and cholesterol. See Pronczuk et al., FASEB J. 8, 1191-1200 (1994).

Gerbils were obtained from Charles River Labs (Wilmington, Mass.) at 50-55 g body weight. Animals were housed individually in a laboratory facility with conditioned air maintained between 68-72 degrees F. with 12 h light/dark cycle. Gerbils were fed a purified diet as described by Hayes et al., where total nutrients including carbohydrate, fat, and protein are standardized and held constant, with appropriate vitamin and mineral mixes. Only the fat composition was manipulated, while fat itself was fed at approximately 40% of the calories, as described in the tables below. Food was fed ad libitum and weighed daily, while the gerbils were given free access to water. Body weights were measured weekly for 4 weeks, at which time animals were exsanguinated under anesthesia.

The plasma was separated by conventional methods, and lipoproteins were isolated by density-gradient ultracentrifugation as VLDL, LDL, and HDL using the method described in Chapman et al., 1981, J Lipid Res 22:339-358. Total plasma and isolated lipoprotein fractions were assayed for cholesterol with a standard enzymatic kit. Plasma triglycerides were similarly measured with a conventional enzymatic kit configured for that purpose.

Appropriate control diets were included, e.g., diets providing extremes in levels of saturated fatty acids versus linoleic acid, thereby providing standards for determining the effects on lipid/lipoprotein levels in response to test dietary fat compositions. For example, in one control diet the dietary fat was provided by an oil high in saturated fatty acids and low in linoleic acid, and in a second control diet the dietary fat was provided by an oil low in saturated fatty acids but rich in linoleic acid (18:2) (safflower oil). Additional intermediate control diets were also utilized, such as a diet in which the dietary fat was provided by a high oleic acid oil with approximately equal levels of linoleic acid and saturated fatty acids (olive oil).

Example 2

Gerbil Model Lipoprotein Studies with Palm Oil Fractions

The gerbil model described in Example 1 was used to test different fractions of palm fats. The gerbil model has previously proven to be highly predictive of human plasma lipoprotein responses to dietary fats.

With each of four groups of gerbils (see Tables 1 and 2), elevated dietary levels of saturated fatty acids (SFA) (palmitic acid was 40-60% of total fatty acids were provided either by palm stearin (diet 710), by a PMF preparation (diet 711), by palm olein (diet 713), or by interesterified palm olein (diet 714). For all groups of animals, 41% of dietary energy was provided by fat, with SFA accounting for 27%, 24%, 19%, and 19% of energy respectively (Table 2). Polyunsaturated fatty acid content was maintained constant at a relatively low level of 4.6% of energy to allow the relative effects of the different saturated fats to be maximally expressed.

TABLE 1

Gerbil diet compositions with palm oil fractions
Diet: 710-714

| | Diet | | | |
|---|---|---|---|---|
| | 710 | 711 | 713 | 714 |
| Palm Fraction | Pst | PMF-35 | Pol | IE Pol |
| CHO:Fat:Protein (% E) | 41:41:18 | 41:41:18 | 41:41:18 | 41:41:18 |
| Kcal/g | 4.3 | 4.3 | 4.3 | 4.3 |
| Dietary Ingredient | (g/kg) | | | |
| Casein | 100 | 100 | 100 | 100 |
| Lactalbumin | 100 | 100 | 100 | 100 |
| Dextrose | 200 | 200 | 200 | 200 |
| Cornstarch | 174 + 60 (w/gel) | 174 + 60 (w/gel) | 174 + 60 (w/gel) | 174 + 60 (w/gel) |
| Cellulose | 100 | 100 | 100 | 100 |
| Fat: | | | | |
| (SFA:MUFA:PUFA as % E) | (27:9:4.6) | (24:12:4.6) | (19:17:4.6) | (19:17:4.6) |
| (P/S) | (0.17) | (0.19) | (0.25) | (0.25) |
| Palm Stearine (Pst) | 185 | 0 | 0 | 0 |
| Palmel-35 (PMF-35) | 0 | 180 | 0 | 0 |
| Palm Oil (PO) | 0 | 0 | 0 | 0 |
| Palm Olein (Pol) | 0 | 0 | 200 | 0 |
| IE Palm Olein (IE Pol) | 0 | 0 | 0 | 200 |
| Safflower Oil | 15 | 20 | 0 | 0 |
| Mineral mix (Ausman - Hayes) | 50 | 50 | 50 | 50 |
| Vitamin mix (Hayes - Cathcart) | 12 | 12 | 12 | 12 |
| Choline chloride | 3 | 3 | 3 | 3 |
| Cholesterol | 0.8 | 0.8 | 0.8 | 0.8 |

Combine 60 g cornstarch with 800 mL water to produce gel that is added to the remaining dry ingredients

TABLE 2

Fatty acid profile of dietary fat

| | Diet | | | |
|---|---|---|---|---|
| | 710 Pst | 711 PMF-35 | 713 Pol | 714 IE Pol |
| | Fatty acid % | | | |
| 8:0 + 10:0 | 0.0 | 0.0 | 0.0 | 0.0 |
| 12:0 | 0.2 | 0.1 | 0.3 | 0.3 |
| 14:0 | 1.1 | 0.6 | 1.0 | 1.0 |
| 16:0 | 60.2 | 52.4 | 40 | 40 |
| 18:0 | 4.8 | 5.3 | 4.3 | 4.3 |
| 18:1 | 22.2 | 30.0 | 41.9 | 41.9 |
| 18:2 | 10.7 | 10.9 | 10.9 | 10.9 |
| 18:3 | 0.4 | 0.2 | 0.4 | 0.4 |
| Total SFA | 66.3 | 58.4 | 45.6 | 45.6 |
| Total MUFA | 22.2 | 30.0 | 41.9 | 41.9 |
| Total PUFA | 11.1 | 11.1 | 11.3 | 11.3 |
| P/S | 0.17 | 0.19 | 0.25 | 0.25 |
| S:M:P in diet | 27:9:4.6 | 24:12:4.6 | 19:17:4.6 | 19:17:4.6 |
| PUFA % E/diet | 4.6 | 4.6 | 4.6 | 4.6 |
| Diet: CHO/Fat/Prot (% E) 41:41:18 | | | | |

The resulting lipoprotein profiles (Table 3) showed surprisingly that the PMF-containing diet resulted in the lowest total cholesterol (TC), VLDL, and LDL/HDL values and the highest HDL value. Owing to statistical confidence limits in the study, PMF in diet 711 can best be compared to palm stearin in diet 710, whereby it is concluded that TC and LDL levels were lower for PMF compared to palm stearin. The HDL value expressed as a percentage of the total cholesterol was higher for PMF than for all other palm fractions.

TABLE 3

Body weight, blood glucose and plasma lipids of gerbils fed diets with different palm oil fractions for 3 wks

| | Diet | | | |
|---|---|---|---|---|
| | 710 Pst | 711 PMF-35 | 713* Pol | 714 IE Pol |
| CHO:Fat:Protein (% E) | 41:41:18 | 41:41:18 | 41:41:18 | 41:41:18 |
| Kcal/g | 4.3 | 4.3 | 4.3 | 4.3 |
| Body weight (g) | | | | |
| Initial | 50 ± 2 | 50 ± 1 | 50 ± 2 | 50 ± 2 |
| Final (after 3 wk) | 59 ± 4 | 59 ± 4 | 57 ± 4 | 59 ± 4 |

TABLE 3-continued

Body weight, blood glucose and plasma lipids of gerbils fed diets with different palm oil fractions for 3 wks

|  | Diet | | | |
|---|---|---|---|---|
|  | 710 Pst | 711 PMF-35 | 713* Pol | 714 IE Pol |
| Gain (g/d) | 0.42 ± 0.16 | 0.38 ± 0.18 | 0.28 ± 14 | 0.37 ± 0.14 |
| Food Intake (g/d) | 5.7 ± 0.5$^{a,b,c}$ | 5.3 ± 0.4$^a$ | 5.1 ± 0.2$^b$ | 5.2 ± 0.4$^c$ |
| (kcal/d) | 25 + 1$^{a,b,c}$ | 23 ± 2$^a$ | 22.1 ± 1$^b$ | 23 ± 2$^c$ |
| F. Blood glucose at 3 wk (mg/dL) | 82 ± 11$^a$ | 74 ± 17 | 69 ± 17 | 67 ± 15$^a$ |
| Organ weights (% BW) | | | | |
| Liver | 3.26 ± 0.21 | 3.30 ± 0.23 | 3.41 ± 0.12 | 3.34 ± 0.26 |
| Kidney | 0.82 ± 0.05$^a$ | 0.85 ± 0.04 | 0.88 ± 0.04$^a$ | 0.86 ± 0.05 |
| Cecum | 2.90 ± 0.35 | 2.81 ± 0.46 | 2.96 ± 0.30 | 2.86 ± 0.42 |
| Adipose | | | | |
| Perirenal | 0.88 ± 0.36$^a$ | 0.68 ± 0.28 | 0.48 ± 0.17$^{a,b}$ | 0.73 ± 0.13$^b$ |
| Epididymal | 1.39 ± 0.26$^a$ | 1.20 ± 0.28 | 1.16 ± 0.30$^{a,b}$ | 1.37 ± 0.22$^b$ |
| Total adipose | 2.27 ± 0.58$^a$ | 1.87 ± 0.58 | 1.64 ± 0.31$^{a,b}$ | 2.10 ± 0.32$^b$ |
| Carcass | 74 ± 1$^{a,b}$ | 75 ± 1$^a$ | 75 ± 1$^c$ | 76 ± 1$^{b,c}$ |
| Plasma | | | | |
| TC (mg/dL) | 215 ± 50$^x$ | 181 ± 24$^x$ | 195 ± 41 | 201 + 47 |
| VLDL-C (mg/dL) | 54 ± 20 | 38 ± 10$^a$ | 56 ± 4 | 82 ± 32$^a$ |
| LDL-C (mg/dL) | 88 ± 11$^{x,y,z}$ | 63 ± 18$^x$ | 57 ± 2$^y$ | 63 ± 15$^z$ |
| HDL-C (mg/dL) | 98 ± 5$^a$ | 89 ± 6 | 76 ± 9 | 73 ± 2$^a$ |
| LDL-C/HDL-C ratio | 0.90 ± 0.16 | 0.71 ± 0.16 | 0.76 ± 0.11 | 0.85 ± 0.18 |
| HDL-C (% of total) | 41 ± 0 | 47 ± 4$^a$ | 40 ± 4 | 34 ± 7$^a$ |
| TG (mg/dL) | 67 ± 36 | 56 ± 29 | 42 ± 24 | 67 ± 82 |

Values are means ± SD (n = 8-9, except for lipoproteins obtained by ultracentifugation of 2 or 3 samples, each representing combined plasma from 3-4 gerbils).
$^{a,b,c,d}$Means in a row sharing a common superscript are significantly different (p < 0.05) using one-way ANOVA and Fisher's PLSD test.
$^{x,y,z}$Means in a row sharing a common superscript are significantly different (p < 0.10) using one-way ANOVA and Fisher's PLSD test.

Example 3

Gerbil Model Lipoprotein Studies with Palm Mid-Fraction Margarine

Gerbil feeding experiments as described in Example 1 were used to test several "balanced fat" margarines containing different natural solid fats to harden vegetable oils (see Tables 4, 5 and 6). Unlike the fat blends described in Tables 1, 2 and 3, which contained high levels of saturated fatty acids (SFA), the margarines described herein contained fat blends providing nearly equal proportions of polyunsaturated fatty acids (PUFA) and SFA except for one margarine (B). Margarine B was used as an experimental control to approximate the combination of fatty acids consumed in the typical American diet ("American Fat Blend" or AFB). The remaining margarines E, G, and H included only natural vegetable fat and unsaturated vegetable oil blends (see Table 5) to achieve a balanced ratio of PUFA and SFA (i.e., approximately a 1:1 ratio of 18:2 PUFA/SFA or "P/S" ratio). This 1:1 ratio was previously found to be beneficial for general dietary use as described in U.S. Pat. Nos. 5,578,334, 5,843,497, 6,630,192, and 7,229,653. Thus, the 18:2 PUFA:SFA "P/S" ratios for margarines E, G and H ranged from approximately 0.9 to 1.3, whereas the ratio for the AFB (margarine B) was only 0.4. For establishing sufficiently stable and firm textures at room temperature with saturated fats, margarine E incorporated 27% palm kernel oil+10% palm oil, margarine G utilized 24% palm oil and 26% palm olein, while margarine H utilized 15% palm mid-fraction and 8% palm oil (see Table 5). With margarine H, PMF-35 contained a level of SFC of about 85% at room temperature whereas the corresponding SFC for palm oil at room temperature is approximately 22%. Therefore, almost 90% of the SFC of margarine H is attributable to the PMF.

Table 6 provides the analytical results from these gerbil studies (diets in Table 4) in which 41% of the dietary energy was provided by the margarines fed as the exclusive source of dietary fat. There were no statistically significant differences in either growth or in final organ or tissue weights among animals consuming the different margarines. However, the margarine B diet resulted in a very poor lipoprotein profile with regard to standard parameters (essentially 2-fold higher values for the parameters including TC, VLDL, LDL, LDL/HDL ratio and TG) compared to the lipoprotein profiles for all of the other diets E, G and H. Interestingly, the PMF-containing margarine H diet produced the lowest total cholesterol (TC) values. The H diet values are statistically lower than the palm kernel oil diet values (margarine E). Otherwise, comparing each of the lipoprotein parameters among the experimental margarines, all of the margarines tested similarly within the statistical confidence limits of the experiment.

TABLE 4

Gerbil diet compositions with margarines B, E, G, H
Diet: 719-722

| | Diet | | | |
|---|---|---|---|---|
| | 719 | 720 | 721 | 722 |
| Margarine | B | E | G | H |
| CHO:Fat:Protein (% E) | 41:41:18 | 41:41:18 | 41:41:18 | 41:41:18 |
| Kcal/g | 4.3 | 4.3 | 4.3 | 4.3 |
| Diet Ingredient | (g/kg) | | | |
| Casein | 100 | 100 | 100 | 100 |
| Lactalbumin | 100 | 100 | 100 | 100 |
| Dextrose | 200 | 200 | 200 | 200 |
| Cornstarch | 174 + 60 (w/gel) | 174 + 60 (w/gel) | 174 + 60 (w/gel) | 174 + 60 (w/gel) |
| Cellulose | 100 | 100 | 100 | 100 |
| Fat: | | | | |
| (SFA:MUFA:PUFA % E) | (17:14:7) | (14:14:12) | (13:13:14) | (7:22:10) |
| (P/S) | (0.40) | (0.90) | (1.18) | (1.34) |
| AFB-Margarine B†* | 250 | 0 | 0 | 0 |
| Margarine E†** | 0 | 250 | 0 | 0 |
| Margarine G†*** | 0 | 0 | 250 | 0 |
| Margarine H†**** | 0 | 0 | 0 | 250 |
| Mineral mix (Ausman - Hayes) | 50 | 50 | 50 | 50 |
| Vitamin mix (Hayes - Cathcart) | 12 | 12 | 12 | 12 |
| Choline chloride | 3 | 3 | 3 | 3 |
| Cholesterol | 0.8 | 0.8 | 0.8 | 0.8 |

Combine 60 g cornstarch with 750 mL water to produce gel that is added to the remaining dry ingredients
†Margarine with 80% fat and 20% water
*Margarine B composition (AFB): 24% Milk Fat + 40% Tallow + 20% Chicken Fat + 16% Soybean Oil
**Margarine E composition: 27% Palm Kernel Oil + 31% Soybean Oil + 32% Canola Oil + 10% Palm Oil
***Margarine G composition (current Smart Balance): 50% Soybean Oil + 26% Palm Olein + 24% Palm Oil
****Margarine H composition: 15% Palm Mid-Fraction (PMF-35) + 8% Palm Oil + 77% Canola Oil

TABLE 5

Fatty acid profile of margarine B, E, G, H

| | Margarine B* | Margarine E** | Margarine G*** | Margarine H**** |
|---|---|---|---|---|
| | Fatty acid % | | | |
| 8:0 + 10:0 | 0.4 | 1.8 | 0.0 | 0.0 |
| 12:0 | 0.8 | 13.0 | 0.1 | 0 |
| 14:0 | 4.1 | 4.5 | 0.6 | 0.2 |
| 16:0 | 22.3 | 11.2 | 25.9 | 15.3 |
| 18:0 | 13.2 | 3 | 4.2 | 2.6 |
| 18:1 | 35.3 | 34.7 | 32.1 | 54.8 |
| 18:2 | 14.5 | 25.1 | 32.3 | 17.5 |
| 18:3 | 2.0 | 5.1 | 3.9 | 6.8 |
| Total SFA | 41.3 | 33.5 | 30.8 | 18.1 |
| Total MUFA | 35.3 | 34.7 | 32.1 | 54.8 |
| Total PUFA | 16.5 | 30.3 | 32.4 | 24.3 |
| P/S | 0.4 | 0.9 | 1.18 | 1.34 |

*Margarine B composition (AFB): 24% Milk Fat + 40% Tallow + 20% Chicken Fat + 16% Soybean Oil
**Margarine E composition: 27% Palm Kernel Oil + 31% Soybean Oil + 32% Canola Oil + 10% Palm Oil
***Margarine G composition (current Smart Balance): 50% Soybean Oil + 26% Palm Olein + 24% Palm Oil
****Margarine H composition: 15% Palm Mid-Fraction (PMF-35) + 8% Palm Oil + 77% Canola Oil

TABLE 6

Body and organ weights, blood glucose and plasma lipids of gerbils fed diets
with different fat blend margarines for 4 weeks (Gerbils Study 10)

| | Diet | | | |
|---|---|---|---|---|
| | 719 Margarine B | 720 Margarine E | 721 Margarine G | 722 Margarine H |
| CHO:Fat:Protein (% E) | 41:41:18 | 41:41:18 | 41:41:18 | 41:41:18 |
| kcal/g | 4.3 | 4.3 | 4.3 | 4.3 |
| Body weight (g) | | | | |
| Initial | 50 ± 3 | 50 ± 3 | 50 ± 3 | 50 ± 2 |
| Final (after 4 wk) | 66 ± 6 | 65 ± 7 | 68 ± 9 | 65 ± 8 |
| Gain (g/d) | 0.74 ± 0.22 | 0.70 ± 0.24 | 0.82 ± 0.32 | 0.67 ± 0.29 |
| Food Intake (g/d) | 5.8 ± 0.6 | 6.3 ± 0.7 | 6.3 ± 0.7 | 6.4 ± 0.9 |

TABLE 6-continued

Body and organ weights, blood glucose and plasma lipids of gerbils fed diets with different fat blend margarines for 4 weeks (Gerbils Study 10)

|  | Diet | | | |
| --- | --- | --- | --- | --- |
|  | 719<br>Margarine B | 720<br>Margarine E | 721<br>Margarine G | 722<br>Margarine H |
| (kcal/d) | 25 ± 3 | 27 ± 3 | 27 ± 3 | 27 ± 4 |
| F. Blood Glucose at 3 wk (mg/dL) | 80 ± 10 | 79 ± 10 | 82 ± 20 | 78 ± 9 |
| Organ weight (% BW) | | | | |
| Liver | 3.74 ± 0.46 | 3.68 ± 0.20 | 3.82 ± 0.29 | 3.86 ± 0.20 |
| Kidney | 0.88 ± 0.04 | 0.87 ± 0.04 | 0.86 ± 0.03 | 0.88 ± 0.06 |
| Cecum | 2.47 ± 0.52 | 2.25 ± 0.49 | 2.25 ± 0.57 | 2.43 ± 0.43 |
| Adipose | | | | |
| Perirenal | 0.95 ± 0.31 | 1.02 ± 0.40 | 1.14 ± 0.50 | 0.94 ± 0.38 |
| Epididymal | 1.68 ± 0.35 | 1.83 ± 0.59 | 1.91 ± 0.60 | 1.76 ± 0.52 |
| Brown Fat | 0.70 ± 0.16 | 0.67 ± 0.15 | 0.78 ± 0.23 | 0.67 ± 0.16 |
| Total Adipose | 3.33 + 0.78 | 3.52 ± 1.02 | 3.82 ± 1.26 | 3.37 ± 0.88 |
| Carcass | 77 ± 1 | 78 ± 1 | 78 ± 1 | 78 ± 2 |
| Plasma | | | | |
| TC (mg/dL) | 200 ± 35$^{a,b,c}$ | 120 ± 25$^{a,d}$ | 103 ± 11$^b$ | 97 ± 13$^{c,d}$ |
| VLDL-C (mg/dL) | 53 ± 9$^{a,b,c}$ | 29 ± 14$^a$ | 21 ± 5$^b$ | 22 ± 4$^c$ |
| LDL-C (mg/dL) | 75 ± 4$^{a,b,c}$ | 31 ± 5$^a$ | 28 ± 3$^b$ | 28 ± 2$^c$ |
| HDL-C (mg/dL) | 76 ± 4$^{a,b,c}$ | 55 ± 7$^a$ | 54 ± 2$^b$ | 47 ± 3$^c$ |
| LDL-C/HDL-C ratio | 0.99 ± 0.01$^{a,b,c}$ | 0.56 ± 0.10$^a$ | 0.53 ± 0.04$^b$ | 0.61 ± 0.05$^c$ |
| % HDL (of total) | 37 ± 1$^{a,b,c}$ | 48 ± 2$^a$ | 52 ± 3$^b$ | 48 ± 2$^c$ |
| TG (mg/dL) | 112 ± 57$^{a,b}$ | 59 ± 20$^a$ | 81 ± 33 | 62 ± 24$^b$ |

Values are mean ± SD (n = 10) except for all the lipoprotein measurements which were obtained by ultracentrifugation of 3 samples representing combined plasma from 2-4 gerbils
$^{a,b,c,d}$Means in a row sharing a common superscript are significanly different (p < 0.05) using one-way ANOVA and Fisher's PLSD test It is possible that the ability to include greater levels of PUFA into PMF-containing margarines (cf. margarine H versus E and G) and thereby produce margarines having higher P/S ratios may contribute to a more favorable lipoprotein profile, in particular a low TC value. This ability to provide higher PUFA levels relative to the SFA content of PMF-containing margarines is attributable to the unusually high SFC measured at room temperature for certain PMF preparations. The ratios of SFC relative to SFA at 20° C. was calculated for different hard fats intended for table use. Adding a solid fat with a higher rather than lower SFC/SFA ratio should be beneficial for hardening an unsaturated vegetable oil while contributing a smaller amount of undesirable SFA. This SFC/SFA ratios calculated were: palm oil=0.44-0.50, palm stearin=0.99, and palm mid-fraction=1.34 for PMF-35. Therefore, certain PMF preparations are surprisingly more efficient than palm stearin at hardening vegetable oils at room temperature with a minimum level of SFA.

Between the two experiments using "low" and "higher" dietary levels of polyunsaturated fatty acids as linoleic acid (4.6% of dietary energy in Diets 710, 711, 713 and 714 (Example 2) and 10-14% of dietary energy in Diets 719, 720, 721 and 722 (Example 3)) the PMF palm fraction outperformed both palm stearin and the AFB margarine with regard to one or more of the following: lowering the plasma levels of TC, VLDL, LDL, and TG within each dietary group.

Example 4

Comparison of Fatty Acid Content of Palm Oil Fractions

The fatty acid compositions of different palm oil sources were compared, and the results are shown in Table 7. An important question is whether any particular palm oil fractions, such as those containing saturated fatty acid-rich triglyceride species that promote the hardening of liquid vegetable oils, are less cholesterolemic than other saturated fatty acid-containing triglycerides. A related question is whether any of the three glyceride carbon positions (sn-1, sn-2 and sn-3) is preferred with regard to improved lipoprotein metabolism for carrying saturated fatty acids.

As shown in Table 7, each of three different palm oil-related fats contains very different proportions of three classes of saturated fatty acid-containing triglycerides and can be evaluated for its effect on mammalian lipoprotein metabolism. The weight percentage content of palmitic acid is provided ("% P" based on the total fatty acids representing 100%) for the three classes of saturated fatty acid-containing triglycerides in palm stearin, PMF, and palm oil. For each of these fats, the relative C16:0 palmitate contents are shown in the numerators along with the relative weights of the saturated triglyceride components (in denominators) for each of the fats (weight of trisaturated triglyceride ("TST"), disaturated ("DST") and monosaturated triglyceride ("MST")).

TABLE 7

|  | % P/weight TST | % P/weight DST | % P/weight MST |
| --- | --- | --- | --- |
| Palm Stearin | 52/35 | 40/37 | 8/16 |
| Palm Mid-Fraction | 5/3 | 90/84 | 5/10 |
| Palm Oil | 15/9 | 61/46 | 24/35 |

From these numbers, it is apparent that palmitic acid is primarily concentrated in DST for palm mid-fraction, whereas it is distributed in TST+DST for stearin and in DST+MST for palm oil.

The numbers were obtained from the literature as follows. The case of a palm stearin with an iodine value (IV) of 30.5 is shown in Che Man et al., "Composition and Thermal Profile of Crude Palm Oil and Its Products," JAOCS; 76; 237-242;

1999), where it is calculated that approximately 52% by weight of the palmitate content is found in TST, 40% in DST, and 8% in MST. Overall, the stearin contains approximately 35% by weight TST, 37% DST and 16% MST. By comparison, for a palm mid-fraction with 34.4 IV (Moran, U.S. Pat. No. 4,115,598), it is calculated that approximately 5% by weight of the palmitate content is found in TST, 90% in DST, and 5% in MST molecules; overall, the mid-fraction contains approximately 3% by weight TST, 83% DST, 10% MST, and 4% unsaturated triglycerides. And finally, for a RBD palm oil having 51.5 IV (Che Man et al., 1999), it is calculated that approximately 15% by weight of the palmitate content is found in TST, 61% in DST, and 24% in MST molecules; overall, the palm oil contains approximately 9% by weight TST, 46% DST, 35% MST, and 5% unsaturated triglycerides.

Example 5

Balancing the Ratio of Saturated Fatty Acids (SFA) and Polyunsaturated Fatty Acids (PUFA) in a PMF Fat—Canola Oil Blend Canola oil is useful as a monounsaturated vegetable oil, for combining with PMF when it is desirable to limit the overall level of SFA to approximately 20% of the fat composition, while also achieving a balanced ratio of PUFA to SFA (e.g., an approximate 1:1 ratio). Accordingly, and by way of example, a concentration of 15% by weight PMF can be used for achieving an appropriate degree of hardening of a regular tub-type canola oil-based table spread containing 64% fat and approximately 33% water (see Table 8). The fat blend composition contains approximately 80% canola oil, 15% by weight PMF-35 and approximately 5% palm oil. The PMF coincidentally contains 64% by weight SFA contributing only about 9.6% SFA to the fat blend and 3.5% linoleic acid. With 80% (w/w) of the fat in the blend being canola oil (containing 7.5% SFA and approximately 21% linoleic acid), the canola contributes only approximately 6.3% SFA and 16.8% linoleic acid to the composition. Collectively, the three fats contribute only 18.4% by weight SFA to the final blended fat composition that also contains 18% linoleic acid. Therefore, quite remarkably, this blend provides a 1:1 balanced ratio of linoleic acid to SFA. Lesser or greater amounts of PMF can be used to produce softer and harder tub spreads and even stick-type margarines (Tables 8 and 9). Commercial preparations of 39% fat-containing light spreads have been produced in which 20% by weight PMF is used to harden a canola-soybean oil fat blend (Table 8). Commercial 78% fat-containing tub margarines have also been produced in which canola oil and a small amount of palm oil have been hardened with 15% by weight PMF (Table 8). In addition, stick margarines have been produced in which a canola oil-soybean oil-palm oil blend is hardened with 23% by weight PMF (see Table 9). Such fat blend compositions should contain little or no partially hydrogenated vegetable oil, the latter containing undesirable trans-fatty acids.

TABLE 8

Tub Spreads and Tub Margarine.

| Description Fat Level | 15% PMF Regular Spread 64% | 20% PMF Light Spread 39% | 15% PMF Tub Margarine 78% |
|---|---|---|---|
| Water | 33.2150 | 58.1278 | 17.7233 |
| Oil, Soybean | | 5.5000 | |
| Oil, Canola | 49.2800 | 25.6608 | 61.6000 |
| Oil, Palm | 5.1200 | | 6.4000 |

TABLE 8-continued

Tub Spreads and Tub Margarine.

| Description Fat Level | 15% PMF Regular Spread 64% | 20% PMF Light Spread 39% | 15% PMF Tub Margarine 78% |
|---|---|---|---|
| Palm Mid Fraction-Palmel 35 | 9.6000 | 7.8000 | 12.0000 |
| Oil, Olive | | 0.0392 | |
| Salt, Evaporated, Non-Iodized | 1.6800 | 1.5960 | 1.8000 |
| Emulifiers, preservatives, colors, flavors, vitamins | 1.1050 | 1.2762 | 0.4767 |
| Total | 100.000 | 100.000 | 100.000 |
| Total without water | 66.7850 | 41.8722 | 82.2767 |

TABLE 9

Margarine Sticks.

| Description Fat Level | 23% PMF Marg. Sticks 78% |
|---|---|
| Water | 18.2770 |
| Oil, Soybean | 6.5222 |
| Oil, Canola | 31.0445 |
| Oil, Palm Stearin | 0.0000 |
| Oil, Palm | 21.9438 |
| Palm Mid Fraction-Palmel 35 | 18.0000 |
| Oil, Olive | 0.079 |
| Oil, Flax seed | 0.8153 |
| Salt, Evaporated, Non-Iodized | 2.2050 |
| Flavors, colors, emulsifiers | 1.1132 |
| Total | 100.000 |
| Total without water | 81.7230 |

Example 6

Formulation of Food Products

Table spreads and margarines were formulated using PMF-containing nutritional fat compositions according to the invention. The formulations are shown in Tables 8-13. Surprisingly low levels of PMF hardstock could be used to effectively harden liquid vegetable oils. Specifically, some PMF preparations having elevated levels of solid fat content (SFC) as measured at or near room temperature (20-21° C. or 70° F.) showed significant advantages over palm oil and palm stearin. Elevated SFC values at room temperature were particularly useful for achieving an overall reduction in the level of fat required for addition to vegetable oils for making margarines. The use of lower levels of fat in the form of PMF contributes lesser amounts of saturated fatty acids to unsaturated vegetable oils, e.g., to canola and soybean oils, used as the foundation in formulating table spreads and margarines.

A 15 wt % level of PMF was found sufficient for hardening a vegetable oil blend (see, e.g., Table 8). This level is about half the level (25 to 30 wt %) of PMF used by Moran in U.S. Pat. No. 4,115,598. Together with the health benefit of reducing plasma cholesterol levels, the reduction in PMF usage level can provide a substantial cost savings because PMF is usually priced at twice the cost per pound of palm oil.

"Nutritional Facts" for the same tub spreads, tub margarines and margarine sticks described in Tables 8 and 9 are provided in Tables 10 through Table 13 herein. These facts are routinely printed on the outside of packaged food products sold to the consumer. In addition, these tables also provide nutritional facts for currently competitive commercial products. Abbreviations used in these tables for other spreads and margarines include "SB" (Smart Balance, Inc., Paramus, N.J.), "Olivio" (Olivio Premium Products, Boston, Mass.), ICBINB ('I Can't Believe It's Not Butter," Unilever United States), CC (Country Crock, Unilever United States), and EB ("Earth Balance," Smart Balance, Paramus, N.J.). In Table 10 it is apparent that the use of 15% PMF hardstock fat can produce a 64% fat-containing regular table spread with a saturated fat level (SATS) of 1.5 g per standard serving size (14 g) that is advantageously as low or lower than competing commercial spreads including the 64% fat SB, the 60% fat Olivio and the 58% fat ICBINB products containing either chemically modified or less desirable hardening fats including interesterified fats. In Table 11, it is apparent that the use of 20% PMF hardstock fat can produce a 39% fat-containing light table spread with a saturated fat level (SATS) of only 1 g per standard serving size (14 g) that is advantageously lower than competing commercial spreads including the 39% fat SB, the 39% fat CC and the 37% fat ICBINB product. In Table 12, it is apparent that the use of 15% PMF hardstock fat can produce a 78% fat-containing tub margarine with a saturated fat level (SATS) of only 2 g per standard serving size (14 g) that is advantageously lower than the current Earth Balance commercial spread containing 3 g saturated fat level. In Table 13, it is apparent that the use of 23% PMF hardstock fat can produce 78% fat-containing margarine sticks with a saturated fat level of only 3.5 g per standard serving size (14 g) that is advantageously as low or lower than competing stick margarines with 3.5-4 g saturated fats including the 78% fat EB stick margarine and the 78% fat ICBINB stick margarine, as well as butter with 7 g saturated fats per 80% fat in a stick.

TABLE 10

Nutritional comparison - Spreads.

Nutrition Facts - Spreads
Serving size 14 g

|  | SB 64% |  | 15% PMF, 64% Fat Regular Spread |  | Olivio 60% |  | ICBINB 58% |  |
|---|---|---|---|---|---|---|---|---|
| Calories | 80 |  | 80 |  | 80 |  | 70 |  |
| Calories from Fat | 80 |  | 80 |  | 70 |  | 70 |  |
|  | % DV |  | % DV |  | % DV |  | % DV |  |
| Total Fat | 9 g | 14% | 9 g | 14% | 8 g | 12% | 8 g | 12% |
| Saturated Fat | 2.5 g | 13% | 1.5 g | 8% | 1.5 g | 8 | 2 g | 10% |
| Trans Fat | 0 g |  | 0 g |  | 0 g |  | 0 g |  |
| Polyunsaturated Fat | 3.5 g |  | 2 g |  | 2 g |  | 4 g |  |
| Monounsaturated Fat | 3 g |  | 5 g |  | 4.5 g |  | 2 g |  |
| Cholesterol | 0 mg | 0% | 0 mg | 0% | 0 mg | 0% | 0 mg | 0% |

TABLE 11

Nutritional comparison - Light Spreads.

Nutrition Facts - Spreads
Serving size 14 g

|  | SB Light 39% |  | 20% PMF, 39% Fat Light Spread |  | CC 39% |  | ICBINB 37% |  |
|---|---|---|---|---|---|---|---|---|
| Calories | 50 |  | 50 |  | 50 |  | 50 |  |
| Calories from Fat | 50 |  | 50 |  | 50 |  | 50 |  |
|  | % DV |  | % DV |  | % DV |  | % DV |  |
| Total Fat | 5 g | 8% | 5 g | 8% | 5 g | 8 | 5 g | 8% |
| Saturated Fat | 1.5 g | 8% | 1 g | 5% | 1.5 g | 8 | 1.5 g | 8% |
| Trans Fat | 0 g |  | 0 g |  | 0 g |  | 0 g |  |
| Polyunsaturated Fat | 2 g |  | 1.5 g |  | 2.5 g |  | 2.5 g |  |
| Monounsaturated Fat | 2 g |  | 3.0 g |  | 1 g |  | 1 g |  |
| Cholesterol | 0 mg | 0% | 0 mg | 0% | 0 mg | 0% | 0 mg | 0% |

* Saturated fat in PMF Spreads (39% fat) is decreased to 1 g from 1.5 g (current SB 39% fat)
* Lowest saturated fat among commercial brands.

TABLE 12

Nutritional comparison - 80% Spreads.

Nutrition Facts - Spreads
Serving size 14 g

|  | EB 78% |  | 15% PMF, 78% Fat Tub Margarine |  |
|---|---|---|---|---|
| Calories | 100 |  | 100 |  |
| Calories from Fat | 100 |  | 100 |  |
|  | % DV |  |  |  |
| Total Fat | 11 g | 17% | 11 g |  |
| Saturated Fat | 3 g | 15% | 2 g |  |
| Trans Fat | 0 g |  | 0 g |  |
| Polyunsaturated Fat | 2.5 g |  | 2.5 g |  |
| Monounsaturated Fat | 5 g |  | 6 g |  |
| Cholesterol | 0 mg | 0% | 0 mg |  |

TABLE 13

Nutritional comparison Sticks.

Nutrition Facts - Sticks
Serving size 14 g

|  | EB Sticks | | 23% PMF, 78% Fat Margarine Sticks | | Butter | | ICBINB 78% | |
|---|---|---|---|---|---|---|---|---|
| Calories | 100 | | 100 | | 100 | | 100 | |
| Calories from Fat | 100 | | 100 | | 100 | | 100 | |
| | | % DV | | % DV | | % DV | | % DV |
| Total Fat | 11 g | 17% | 11 g | 17% | 11 g | 17% | 11 g | 17% |
| Saturated Fat | 4 g | 20% | 3.5 g* | 18% | 7 g | 36% | 3.5 g | 18% |
| Trans Fat | 0 g | | 0 g | | 0 g | | 0 g | |
| Polyunsaturated Fat | 2.5 g | | 2 g | | 2.5 g | | 4.5 g | |
| Monounsaturated Fat | 4.5 g | | 5 g | | 4.5 g | | 3 g | |
| Cholesterol | 0 mg | 0% | 0 mg | 0% | 30 mg | 10% | 0 mg | 0% |

*Possible with 19.5% PMF
*PMF Sticks (80% fat) are significantly superior to current EB Sticks in sensory qualities
*Current EB Sticks have waxy mouth feel whereas PMF Sticks (80% fat) have butter-like quality
*Reduced saturated fat (3 g) is sufficient for PMF Sticks containing 64.5% fat Example 7

Substitution of PMF Fat for Palm Stearin

As explained above, PMF fats are rich in DST molecules (>60% by weight), containing predominantly palmitic and/or stearic acids at the sn-1 and sn-3 positions of the molecule and oleic or linoleic acid at the sn-2 position. While typical palm stearins also contain DST (~37% by weight) they are enriched in trisaturated triglycerides or TST (~35% by weight). It is known that different commercial preparations of PMF contain varying amounts of TST typically as tripalmitin molecules that contribute to the solid fat content or SFC of the fat. However TST, that is found in abundance in palm stearin, is shown in the present studies to be cholesterolemic, and with the PMFs selected for use herein, the level of both TST and MST molecules are therefore being reduced relative to the amount of DST provided. For purposes of comparison, in their article entitled "Composition and Thermal Profile of Crude Palm Oil and Its Products," Che Man et al. (1999) report that refined, bleached and deodorized palm oil contains, by weight, approximately 9% TST, 46% DST, 35% MST, 5% tri-unsaturated triglycerides and 5% diglycerides. For the PMF selected and used herein as a hardstock, less than 5% by weight of TST should remain in the purified PMF preparation. MST molecules, on the other hand are not particularly cholesterolemic when compared to TST, but they add undesirable SFA to the PMF preparation without contributing significantly to the useful solid fat content above room temperature, e.g., between approximately 22 and 30° C. Therefore, the level of MST in the PMF should be reduced to less than 25%, and preferably to 20% or less.

TABLE 14

Physical Characteristics of Palm Oil and Palm Oil Sub-Fractions

| | Palm Oil | Palm Olein | Palm Stearin | Palm Mid-Fraction 35 |
|---|---|---|---|---|
| Iodine Value | 50.3§ | 56.1§ | 30.0§ ⌀ | 33-35§, 34.4# |
| Mettler Drop Pt. (° C.)§ | 40.3 | 25.1 | 55.8 | 31-33 |
| Fatty Acid Comp. (%)§ | | | | |
| SFA | 50.4 | 45.8 | 70.9 | 64.2 |
| MUFA | 39.6 | 42.2 | 23.2 | 32.1 |
| PUFA | 9.7 | 11.3 | 5.7 | 3.7 |
| C12:0 | 0.3 | 0.3 | 0.2 | 0.1 |
| C14:0 | 1.1 | 1.0 | 1.2 | 0.7 |
| C16:0 | 44.5 | 40.0 | 64.5 | 57.5 |
| C16:1 | 0.3 | 0.3 | 0.2 | 0.1 |
| C18:0 | 4.3 | 4.3 | 5.0 | 5.6 |
| C18:1 | 39.3 | 41.9 | 23.0 | 32.0 |
| C18:2 | 9.5 | 10.9 | 5.3 | 3.5 |
| C18:3 | 0.2 | 0.4 | 0.4 | 0.2 |
| C20:0 | 0.2 | 0.2 | | 0.3 |
| Triglycerides (%) | | | | |
| Trisaturates $S_3$ | 8.7† | 2.8† | 35.2† | 3.1# (1-6) |
| Disaturates $S_2U$ | 46.0† | 47.6† | 36.6† | 83.6# (80-90) |
| Monosaturates $SU_2$ | 35.2† | 38.8† | 16.4† | 9.8# (6-12) |
| Unsaturates $U_3$ | 5.0† | 5.3† | 4.0† | 3.5# (1-6) |

TABLE 14-continued

Physical Characteristics of Palm Oil and Palm Oil Sub-Fractions

|  | Palm Oil | Palm Olein | Palm Stearin | Palm Mid-Fraction 35 |
|---|---|---|---|---|
| Solid Fat Content (%) | | | | |
| 20° C. | 20.5¶ | 1-2§ | 70⊘ | 86.1§ |
| 25° C. | 11.3¶ | 0 | 60⊘ | 74.7§ |
| 30° C. | 8.6¶ | 0 | 49⊘ | 38.4§ |
| 35° C. | 2.6¶ | 0 | 38⊘ | 0.0§ |
| Ratio 18:1:(16:0 + 18:0) | 0.81 | 0.95 | 0.33 | 0.51 |

⊘Mat Sahri, et al. (2010) Palm Stearin as Low Trans Hard Stock for Margarine
Moran, U.S. Pat. No. 4,115,598
§Fuji Vegetable Oil Inc. sample analysis (Savannah, GA)
†Che Man, et. al. (1999) Composition and Thermal Profile of Crude Palm Oil and its Products
¶Noor Lida, et al., NMR analysis It will be readily apparent to one skilled in the art that varying substitutions and modifications may be made to the invention disclosed herein without departing from the scope and spirit of the invention. For example, in addition to the natural dietary fats listed herein, others that are not listed may be incorporated into the compositions described herein. Likewise, other sources of disaturated triglycerides, palmitic acid, linoleic acid, and other fatty acids and fats not listed herein that decrease plasma levels of total cholesterol (TC) and/or LDL-C and/or the ratio of TC/HDL-C and/or the ratio of LDL-C/HDL-C, may be incorporated into the compositions described herein, and used in combinations and concentrations not described herein, to produce natural fat blends as well as new fats that fall within the scope of the present invention. Genetically engineered and naturally selected plant species that produce fats whose triglycerides are structured and whose fatty acid levels are in accordance with the present invention also fall within the scope of the present invention. Thus, such additional embodiments are within the scope of the present invention.

Where features or aspects of the invention are described in terms of Markush groups or other grouping of alternatives, the invention is also intended to include embodiments encompassing any individual member or subgroup of members of the Markush group or other group. Also, unless indicated to the contrary, where various numerical values or value range endpoints are provided for description of certain embodiments, additional embodiments are intended as which are described by taking any 2 different values as the endpoints of a range or by taking two different range endpoints from specified ranges as the endpoints of an additional range. Such ranges are also within the scope of the described invention. Further, specification of a numerical range including values greater than one includes specific description of each integer value within that range.

The invention claimed is:

1. A margarine or table spread composition comprising:
   at least one triglyceride-based palm mid-fraction fat; and
   at least one triglyceride-based unsaturated vegetable oil;
   wherein the fat portion of the composition contains from 10% to 22% by weight of said at least one palm mid-fraction fat and from 60% to 90% by weight of said at least one unsaturated vegetable oil;
   wherein the linoleic acid content of the composition is from 15% to 45% by weight based on the total weight of fatty acids in the composition;
   wherein the composition is solid or semi-solid at 20° C. and fluid at 35° C.; and
   wherein the composition is substantially free of synthetic trans-fatty acids.

2. The composition of claim 1, wherein the saturated fatty acid content of the composition is from 15% to 40% by weight based on the total weight of fatty acids in the composition.

3. The composition of claim 1, wherein the saturated fatty acid content of the composition is from 15% to 23% by weight based on the total weight of fatty acids in the composition.

4. The composition of claim 1, wherein the fat portion of the composition comprises from 75% to 90% by weight of said at least one unsaturated vegetable oil.

5. The composition of claim 1, wherein said at least one unsaturated vegetable oil is selected from the group consisting of monounsaturated vegetable oils, polyunsaturated vegetable oils, and combinations thereof.

6. The composition of claim 5, wherein the at least one unsaturated vegetable oil is selected from the group consisting of olive oil, high oleic sunflower oil, canola oil, soybean oil, corn oil, peanut oil, sunflower oil, safflower oil, cottonseed oil, and combinations thereof.

7. The composition of claim 1 that is substantially free of chemically modified vegetable oils and/or fats.

8. The composition of claim 1, wherein the palm mid-fraction fat or the vegetable oil was obtained by supplementing one or more natural fats or oils with one or more fat components isolated from a natural fat, or with a chemically modified fat component, or with a synthetic fat component.

9. The composition of claim 1 that is substantially cholesterol-free.

10. The composition of claim 1 that contains from 8% to 20% by weight of disaturated triglycerides based on the total weight of triglycerides in the composition.

11. The composition of claim 1, wherein the weight ratio of disaturated to trisaturated triglycerides is greater than 15:1.

12. The composition of claim 1, wherein the weight ratio of disaturated to trisaturated triglycerides is greater than 20:1.

13. The composition of claim 1 that contains less than 3% by weight of trisaturated triglycerides based on the total weight of triglycerides in the composition.

14. The composition of claim 1 that has a solid fat content measured at 20° C. of from 9% to 24% by weight.

15. The composition of claim 1, wherein said at least one unsaturated vegetable oil is selected from the group consisting of monounsaturated vegetable oils, polyunsaturated vegetable oils, and combinations thereof; and wherein the ratio of linoleic acid to saturated fatty acids selected from the group consisting of palmitic acid and stearic acid ranges from about 1:1 to about 3:1.

16. The composition of claim 1, wherein said at least one unsaturated vegetable oil is selected from the group consisting of soybean oil, canola oil, corn oil, sunflower oil, safflower oil, cottonseed oil, peanut oil, olive oil, and combinations thereof.

17. The composition of claim 1, wherein the weight ratio of linoleic acid to saturated fatty acids is from about 1:1 to 3:1.

18. The composition of claim 1, wherein the trisaturated triglyceride content of the composition is less than 2% based on the total weight of triglycerides in the composition.

19. The composition of claim 1, wherein the trisaturated triglyceride content of the composition is less than 1% based on the total weight of triglycerides in the composition.

20. The composition of claim 1 that consists essentially of said at least one palm mid-fraction fat and said at least one unsaturated vegetable oil.

21. A food product comprising a fat composition comprising at least one triglyceride-based palm mid-fraction fat and at least one triglyceride-based unsaturated vegetable oil; wherein the fat composition contains from 10% to 22% by weight of said at least one palm mid-fraction fat and from 60% to 90% by weight of said at least one unsaturated vegetable oil; and wherein the linoleic acid content of the fat composition is from 15% to 45% by weight based on the total weight of fatty acids in the composition, wherein the food product is selected from the group consisting of shortenings, baked goods, fried goods, filled dairy products, fat-containing confections, mayonnaise, and salad dressings.

22. The food product of claim 21, wherein the fat composition is emulsified with water.

23. The food product of claim 22 containing from 40% to 85% by weight of said fat composition.

24. The food product of claim 22 containing from 15% to 60% by weight of water.

25. The composition of claim 1, wherein the at least one palm mid-fraction fat contains from about 60% to about 95% by weight of disaturated triglycerides and less than 6% by weight of trisaturated triglycerides based on the total triglycerides in the at least one palm mid-fraction fat, and more than 50 mol % of the disaturated triglycerides in the at least one palm mid-fraction fat contain either palmitic acid or a combination of palmitic acid and stearic acid at the sn-1 and sn-3 positions and either oleic acid or linoleic acid at the sn-2 position; wherein the disaturated triglyceride content of the composition is from 8% to 23% by weight based on the total weight of triglycerides in the composition; wherein the weight ratio of said disaturated triglycerides to trisaturated triglycerides in the composition is greater than 10:1; and wherein the content of (myristic acid+lauric acid) in the composition is less than 10% by weight based on the total weight of fatty acids in the composition.

26. The composition of claim 1, wherein the fat portion of the composition contains from 10% to 20% by weight of said at least one palm mid-fraction fat.

27. The composition of claim 1, wherein the fat portion of the composition contains from 10% to 18% by weight of said at least one palm mid-fraction fat.

28. The composition of claim 1, wherein the fat portion of the composition contains 15% by weight of said at least one palm mid-fraction fat.

29. The composition of claim 1, wherein the linoleic acid content of the composition is from 20% to 40% by weight based on the total weight of fatty acids in the composition.

30. The composition of claim 1, wherein the linoleic acid content of the composition is from 25% to 40% by weight based on the total weight of fatty acids in the composition.

* * * * *